United States Patent
Ohno et al.

(10) Patent No.: US 12,187,217 B2
(45) Date of Patent: Jan. 7, 2025

(54) AIRBAG DEVICE AND PASSENGER PROTECTION DEVICE

(71) Applicant: TOYOTA JIDOSHA KABUSHIKI KAISHA, Toyota (JP)

(72) Inventors: Mitsuyoshi Ohno, Miyoshi (JP); Takeshi Yamamoto, Toki (JP); Toshiki Iwama, Toyota (JP); Yoshito Kusuhara, Ichinomiya (JP); Tsutomu Ishii, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/367,639

(22) Filed: Sep. 13, 2023

(65) Prior Publication Data

US 2024/0123933 A1    Apr. 18, 2024

(30) Foreign Application Priority Data

Oct. 14, 2022    (JP) .................................. 2022-165756

(51) Int. Cl.
| | |
|---|---|
| *B60R 21/207* | (2006.01) |
| *B60R 21/233* | (2006.01) |
| *B60R 21/2338* | (2011.01) |
| *B60R 21/264* | (2006.01) |

(Continued)

(52) U.S. Cl.
CPC .......... *B60R 21/207* (2013.01); *B60R 21/233* (2013.01); *B60R 21/2338* (2013.01); *B60R 21/264* (2013.01); *B60R 2021/0004* (2013.01); *B60R 2021/006* (2013.01); *B60R 21/013* (2013.01); *B60R 2021/2076* (2013.01); *B60R 2021/2078* (2013.01);

(Continued)

(58) Field of Classification Search
CPC ........................... B60R 21/207; B60R 21/233
See application file for complete search history.

(56) References Cited

U.S. PATENT DOCUMENTS

| | | | |
|---|---|---|---|
| 10,351,090 B2 * | 7/2019 | Yamada | B60R 21/233 |
| 11,285,903 B2 * | 3/2022 | Kokeguchi | B60R 21/207 |
| 11,285,904 B2 * | 3/2022 | Jung | B60R 21/2338 |

(Continued)

FOREIGN PATENT DOCUMENTS

| | | | | |
|---|---|---|---|---|
| DE | 19834061 A1 * | 2/2000 | | B60N 2/4876 |
| DE | 202007008161 U1 * | 10/2007 | | B60R 21/217 |

(Continued)

*Primary Examiner* — Barry Gooden, Jr.
(74) *Attorney, Agent, or Firm* — Dinsmore & Shohl LLP

(57) ABSTRACT

An airbag device includes an airbag that is supplied with gas during a vehicle collision, and that inflates and deploys from a rear side of a vehicle seat toward a front side via an upper side thereof. In an inflated and deployed state the airbag includes a pair of front-rear chambers extending in a front-rear direction via left and right sides of the head of a passenger, and an airbag body in communication with the pair of front-rear chambers, that is disposed at a front side of the passenger between the pair of front-rear chambers, and that is compression deformed in a state supported by the pair of front-rear chambers during restraint of the passenger. The airbag is configured such that entry of at least the head of the passenger into gaps between the front-rear chambers and the airbag body is suppressed during a latter half of restraining the passenger.

17 Claims, 21 Drawing Sheets

(51) Int. Cl.
*B60R 21/00* (2006.01)
*B60R 21/013* (2006.01)

(52) U.S. Cl.
CPC ............... *B60R 2021/23308* (2013.01); *B60R 2021/23388* (2013.01); *B60R 2021/2642* (2013.01)

(56) References Cited

U.S. PATENT DOCUMENTS

| | | | | |
|---|---|---|---|---|
| 11,383,667 | B1* | 7/2022 | Kadam | B60R 21/23138 |
| 11,427,150 | B1* | 8/2022 | Jaradi | B60R 21/207 |
| 11,577,682 | B1* | 2/2023 | Bates | B60R 21/214 |
| 2006/0119083 | A1* | 6/2006 | Peng | B60R 21/2338 |
| | | | | 280/730.2 |
| 2007/0205591 | A1* | 9/2007 | Bito | B60R 21/233 |
| | | | | 280/743.2 |
| 2009/0189376 | A1* | 7/2009 | Vigeant | B60R 21/233 |
| | | | | 280/743.2 |
| 2015/0166002 | A1* | 6/2015 | Fukawatase | B60R 21/233 |
| | | | | 280/730.1 |
| 2016/0121839 | A1* | 5/2016 | Ko | B60R 21/233 |
| | | | | 280/730.1 |
| 2017/0015272 | A1* | 1/2017 | Ohno | B60R 22/46 |
| 2017/0028955 | A1* | 2/2017 | Ohno | B60R 21/233 |
| 2017/0057456 | A1* | 3/2017 | Ohno | B60R 21/231 |
| 2017/0158155 | A1* | 6/2017 | Ohno | B60R 21/237 |
| 2017/0282834 | A1* | 10/2017 | Sugie | B60R 21/231 |
| 2017/0291565 | A1* | 10/2017 | Yamamoto | B60R 21/2334 |
| 2017/0297524 | A1* | 10/2017 | Sugie | B60R 21/233 |
| 2017/0334385 | A1* | 11/2017 | Sakakibara | B60N 2/686 |
| 2018/0056922 | A1* | 3/2018 | Yamada | B60R 21/205 |
| 2018/0126942 | A1* | 5/2018 | Ohno | B60R 21/237 |
| 2018/0222432 | A1* | 8/2018 | Schneider | B60R 21/262 |
| 2018/0236962 | A1* | 8/2018 | Ohno | B60R 21/23138 |
| 2019/0016293 | A1* | 1/2019 | Saso | B60R 21/23138 |
| 2019/0031132 | A1* | 1/2019 | Dry | B60R 21/2338 |
| 2019/0054884 | A1* | 2/2019 | Dry | B60R 21/2342 |
| 2019/0111879 | A1* | 4/2019 | Ohmi | B60R 21/231 |
| 2019/0275979 | A1* | 9/2019 | Dry | B60R 21/207 |
| 2019/0291678 | A1* | 9/2019 | Cho | B60R 21/233 |
| 2019/0389420 | A1* | 12/2019 | Dry | B60R 21/231 |
| 2020/0156586 | A1* | 5/2020 | Lin | B60R 21/013 |
| 2020/0290548 | A1* | 9/2020 | Kokeguchi | B60R 21/233 |
| 2021/0061211 | A1* | 3/2021 | Jung | B60R 21/2338 |
| 2021/0402949 | A1* | 12/2021 | Sung | B60R 21/2338 |
| 2022/0203921 | A1* | 6/2022 | Kawamura | B60R 21/2338 |
| 2022/0340096 | A1* | 10/2022 | Axblom | B60R 21/2338 |
| 2022/0348161 | A1* | 11/2022 | Faruque | B60R 21/233 |
| 2022/0388472 | A1* | 12/2022 | Hwangbo | B60R 21/23138 |
| 2023/0065150 | A1* | 3/2023 | Min | B60R 21/233 |
| 2023/0067856 | A1* | 3/2023 | Min | B60R 21/233 |
| 2023/0294629 | A1* | 9/2023 | Nakajima | B60R 21/233 |
| | | | | 280/729 |
| 2023/0303028 | A1* | 9/2023 | Ohno | B60R 21/233 |
| 2023/0339421 | A1* | 10/2023 | Yamamoto | B60R 21/207 |
| 2023/0406258 | A1* | 12/2023 | Line | B60R 21/214 |

FOREIGN PATENT DOCUMENTS

| | | | | |
|---|---|---|---|---|
| DE | 102017131121 | A1 * | 6/2019 | |
| DE | 102019118843 | A1 * | 1/2021 | ........... B60R 21/207 |
| DE | 102023106465 | A1 * | 10/2023 | ........... B60R 21/207 |
| DE | 102022118796 | A1 * | 2/2024 | |
| JP | 2019-018593 | A | 2/2019 | |
| JP | 2019-218013 | A | 12/2019 | |

* cited by examiner

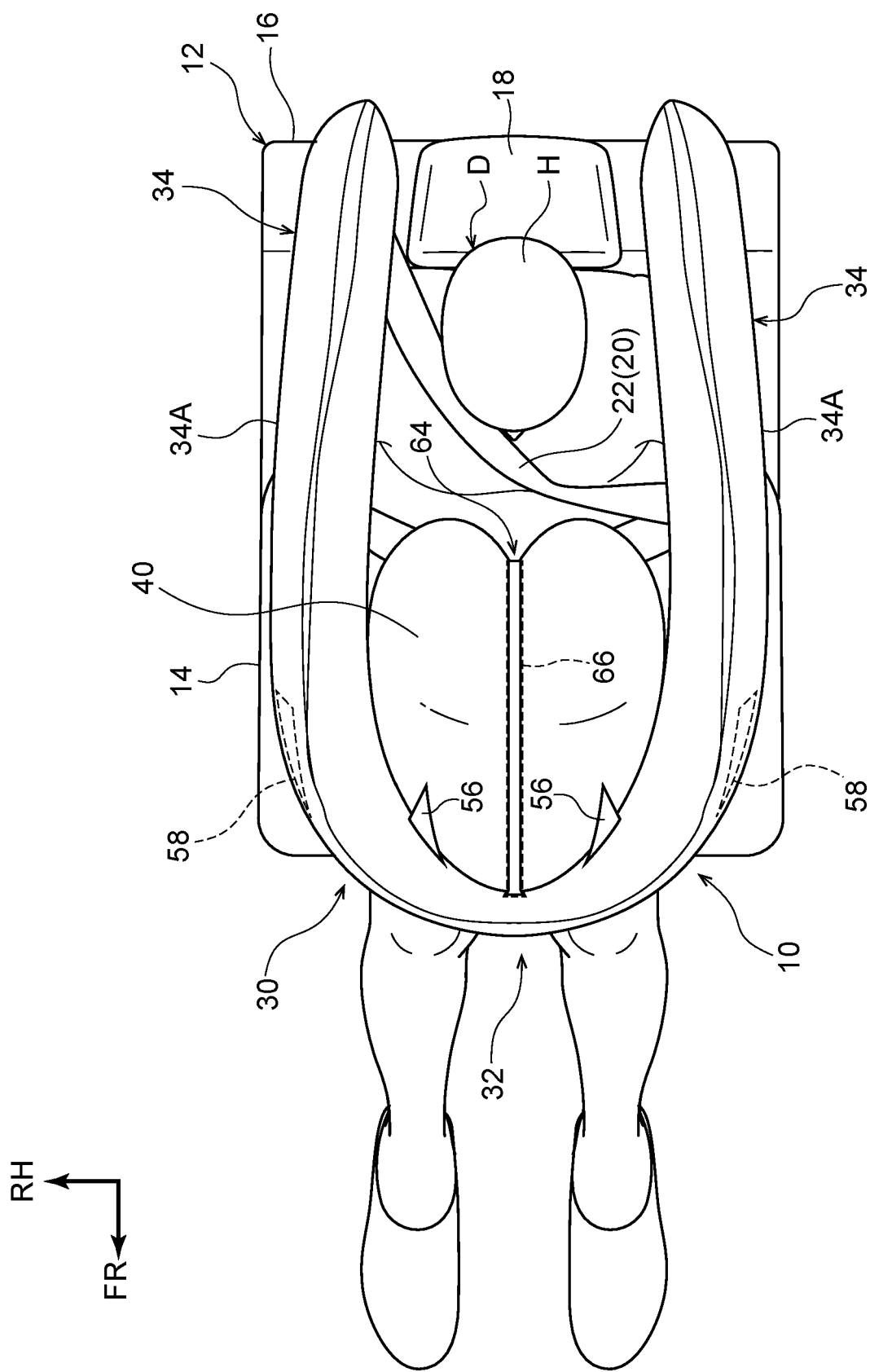

AIRBAG DEVICE AND PASSENGER PROTECTION DEVICE

CROSS-REFERENCE TO RELATED APPLICATION

This application is based on and claims priority under 35 USC 119 from Japanese Patent Application No. 2022-165756 filed on Oct. 14, 2022, the disclosure of which is incorporated by reference herein.

BACKGROUND

Technical Field

The present disclosure relates to an airbag device and to a passenger protection device including an airbag device.

Related Art

For example, an airbag device disclosed in Japanese Patent Application Laid-Open (JP-A) No. 2019-018593 includes an inflator that generates gas at high pressure during a shock input, and a bag body that inflates and deploys from a seatback of a vehicle seat on receipt of gas supplied from the inflator. The bag body includes a trunk support section that deploys at an opposite side of a trunk of a passenger seated in the vehicle seat to the seatback side of the trunk, and a pair of head support sections that respectively deploy at each seat width direction side of the head of the passenger and that connect to the trunk support section. In a deployed state, an escape portion is formed at the bag body so as to pass through in a height direction between the pair of head support sections and avoiding the head of the passenger. Furthermore, there is a coupling member provided in the airbag device to couple between the deployed trunk support section and either the vehicle seat or vehicle body.

For example, an airbag device disclosed in JP-A No. 2019-218013 includes an inflator, and an airbag that is deployed by gas supplied from the inflator. The airbag includes a rear inflation portion that deploys at a back face side of a seat, a pair of side inflation portions that extend toward a front side from both width direction sides of the rear inflation portion, and a pair of front inflation portions that extend from the pair of side inflation portions toward a center therebetween, that are mutually coupled together at the center side, and that cover across in front of the passenger. A gas pathway is formed through this airbag for gas to flow in the sequence of the rear inflation portion, the side inflation portions, and the front inflation portions.

An airbag body (bag body, airbag) of such an airbag device mainly restrains the upper body of a passenger by relative tensional load toward the seat rear side. This means that there is a concern that a sufficient and appropriate tensional load effect might not be obtained when a vehicle has had an offset collision or an oblique collision and the passenger has moved toward a seat oblique front side, and that the passenger, and particularly the head of the passenger, might slide past the airbag body.

SUMMARY

The present disclosure obtains an airbag device capable of appropriately restraining a passenger even when a vehicle has had an offset collision or an oblique collision and the passenger has moved toward a seat oblique front side, and a passenger protection device of the same.

An airbag device of a first aspect includes an inflator that generates gas during a vehicle collision, and an airbag that is supplied with gas generated by the inflator, and that inflates and deploys from a seat rear side of a vehicle seat toward a seat front side via a seat upper side. In an inflated and deployed state, the airbag includes a pair of front-rear chambers extending in a seat front-rear direction via left and right sides of the head of a passenger seated in the vehicle seat, and an airbag body that is in communication with the pair of front-rear chambers, that is disposed at a seat front side of the passenger between the pair of front-rear chambers, and that is compression deformed in a state supported by the pair of front-rear chambers during restraint of the passenger. The airbag is configured such that entry of at least the head of the passenger into a gap between the front-rear chamber and the airbag body is suppressed during a latter half of restraining the passenger.

In the first aspect the gas generated by the inflator during a vehicle collision is supplied to the airbag, and the airbag inflates and deploys from a seat rear side of the vehicle seat toward the seat front side via a seat upper side. In the inflated and deployed state, the airbag includes the pair of front-rear chambers extending in the seat front-rear direction via left and right sides of the head of the passenger seated in the vehicle seat, and the airbag body that is in communication with the pair of front-rear chambers, that is disposed at a seat front side of the passenger between the pair of front-rear chambers, and that is compression deformed in a state supported by the pair of front-rear chambers during restraint of the passenger.

The airbag is configured such that entry of at least the head of the passenger into the gap between the front-rear chamber and the airbag body is suppressed during a latter half of restraining the passenger.

This means that the passenger is restrained appropriately even when the vehicle has had an offset collision or an oblique collision and the passenger has moved toward the seat oblique front side. Note that reference here to "during a vehicle collision" encompasses when the inevitability of a collision is foreseen (predicted).

An airbag device of a second aspect is the airbag device of the first aspect, wherein the airbag includes a left-right pair of upper tethers that couple the front-rear chambers to upper portions of the airbag body, and a left-right pair of lower tethers that couple the front-rear chambers to lower portions of the airbag body. At least the lower tethers are planar tethers having a substantially triangular shape configured with left-right symmetrical shapes to cover the gaps.

In the second aspect the airbag includes the left-right pair of upper tethers that couple the front-rear chambers to upper portions of the airbag body, and the left-right pair of lower tethers that couple the front-rear chambers to lower portions of the airbag body. At least the lower tethers are planar tethers having a substantially triangular shape configured with left-right symmetrical shapes to cover the gaps. This means that the passenger is restrained appropriately by the lower tethers even when the vehicle has had an offset collision or an oblique collision and the passenger has moved toward the seat oblique front side.

The airbag device of a third aspect is the airbag device of the first aspect, wherein the airbag includes a left-right pair of lower inflating portions that fill gaps between the front-rear chambers and lower portions of the airbag body.

In the third aspect the airbag includes the left-right pair of lower inflating portions that fill gaps between the front-rear chambers and lower portions of the airbag body. This means that the passenger is restrained appropriately by the lower inflating portions even when the vehicle has had an offset collision or an oblique collision and the passenger has moved toward the seat oblique front side.

An airbag device of a fourth aspect is the airbag device of the third aspect, wherein the airbag includes a left-right pair of upper inflating portions that fill gaps between the front-rear chambers and upper portions of the airbag body.

In the fourth aspect the airbag includes the left-right pair of upper inflating portions that fill gaps between the front-rear chambers and upper portions of the airbag body. This means that the passenger is restrained appropriately by the upper inflating portions even when the vehicle has had an offset collision or an oblique collision and the passenger has moved toward the seat oblique front side.

An airbag device of a fifth aspect is the airbag device of the third aspect, wherein the lower inflating portions are configured so as to be supplied with the gas from the front-rear chambers through lower communication holes, with an opening surface area of the lower communication holes being smaller than an opening surface area of a communication hole for supplying the gas from the front-rear chambers to the airbag body.

In the fifth aspect, the lower inflating portions are configured so as to be supplied with the gas from the front-rear chambers through lower communication holes, with the opening surface area of the lower communication holes being smaller than the opening surface area of the communication hole for supplying the gas from the front-rear chambers to the airbag body. This accordingly means that deployment of the airbag body is not delayed even though this is a configuration provided with the lower inflating portions.

An airbag device of a sixth aspect is the airbag device of the fourth aspect, wherein the upper inflating portions are configured so as to be supplied with the gas from the front-rear chambers through upper communication holes, with an opening surface area of the upper communication holes being smaller than an opening surface area of a communication hole for supplying the gas from the front-rear chambers to the airbag body.

In the sixth aspect, the upper inflating portions are configured so as to be supplied with the gas from the front-rear chambers through upper communication holes, with the opening surface area of the upper communication holes being smaller than the opening surface area of the communication hole for supplying the gas from the front-rear chambers to the airbag body. This accordingly means that the deployment of the airbag body is not delayed even though this is a configuration provided with the upper inflating portions.

Moreover, an airbag device of a seventh aspect is the airbag device of the first aspect, wherein bulge portions having convex shapes to fill gaps relative to the airbag body are formed at the front-rear chambers on inside faces opposing each other in a seat width direction.

In the seventh aspect, the bulge portions having convex shapes to fill gaps relative to the airbag body are formed at the front-rear chambers on the inside faces opposing each other in the seat width direction. This means that the passenger is restrained appropriately by the convex shaped bulge portions even when the vehicle has had an offset collision or an oblique collision and the passenger has moved toward the seat oblique front side.

An airbag device of an eighth aspect is the airbag device of the first aspect, wherein the airbag includes a pair of guide cloths to cover the gaps and having respective one-end portions sewn to the front-rear chambers at inside faces opposing each other in a seat width direction, and respective other-end portions sewn to the airbag body.

In the eighth aspect, the airbag includes the pair of guide cloths to cover the gaps and having the respective one-end portions sewn to the front-rear chambers at inside faces opposing each other in the seat width direction, and the respective other-end portions sewn to the airbag body. This means that the passenger is restrained appropriately by the guide cloths even when the vehicle has had an offset collision or an oblique collision and the passenger has moved toward the seat oblique front side.

The airbag device of a ninth aspect is the airbag device of the first aspect, wherein a recess in plan view is formed at a seat width direction central portion of a wall face on a seat rear side of the airbag body.

In the ninth aspect, the recess in plan view is formed at the seat width direction central portion of the wall face on the seat rear side of the airbag body. This accordingly means that the passenger is held by the airbag body without coming out from the recess even in cases in which the vehicle has had an offset collision or an oblique collision and the passenger has moved to a seat oblique front side. Namely, the passenger is restrained appropriately by the airbag body.

A passenger protection device of a tenth aspect includes a vehicle seat for a passenger to sit on, and the airbag device of any one of the first aspect to the ninth aspect installed at a location at a seat rear side of the vehicle seat.

In the tenth aspect, the airbag device is installed at the location at the seat rear side of the vehicle seat on which the passenger sits. The airbag device is the airbag device of any one of the first aspect to the ninth aspect, and so similar operation and effects to those of the first aspect to the ninth aspect are obtained.

As described above, the present disclosure enables a passenger to be restrained appropriately even when the vehicle has had an offset collision or an oblique collision and the passenger has moved toward the seat oblique front side.

BRIEF DESCRIPTION OF THE DRAWINGS

Exemplary embodiments of the present disclosure will be described in detail based on the following figures, wherein:

FIG. 14 is a schematic plan view illustrating an airbag of an airbag device according to a fifth exemplary embodiment in an inflated and deployed state with respect to a passenger;

DETAILED DESCRIPTION

Figure 1:
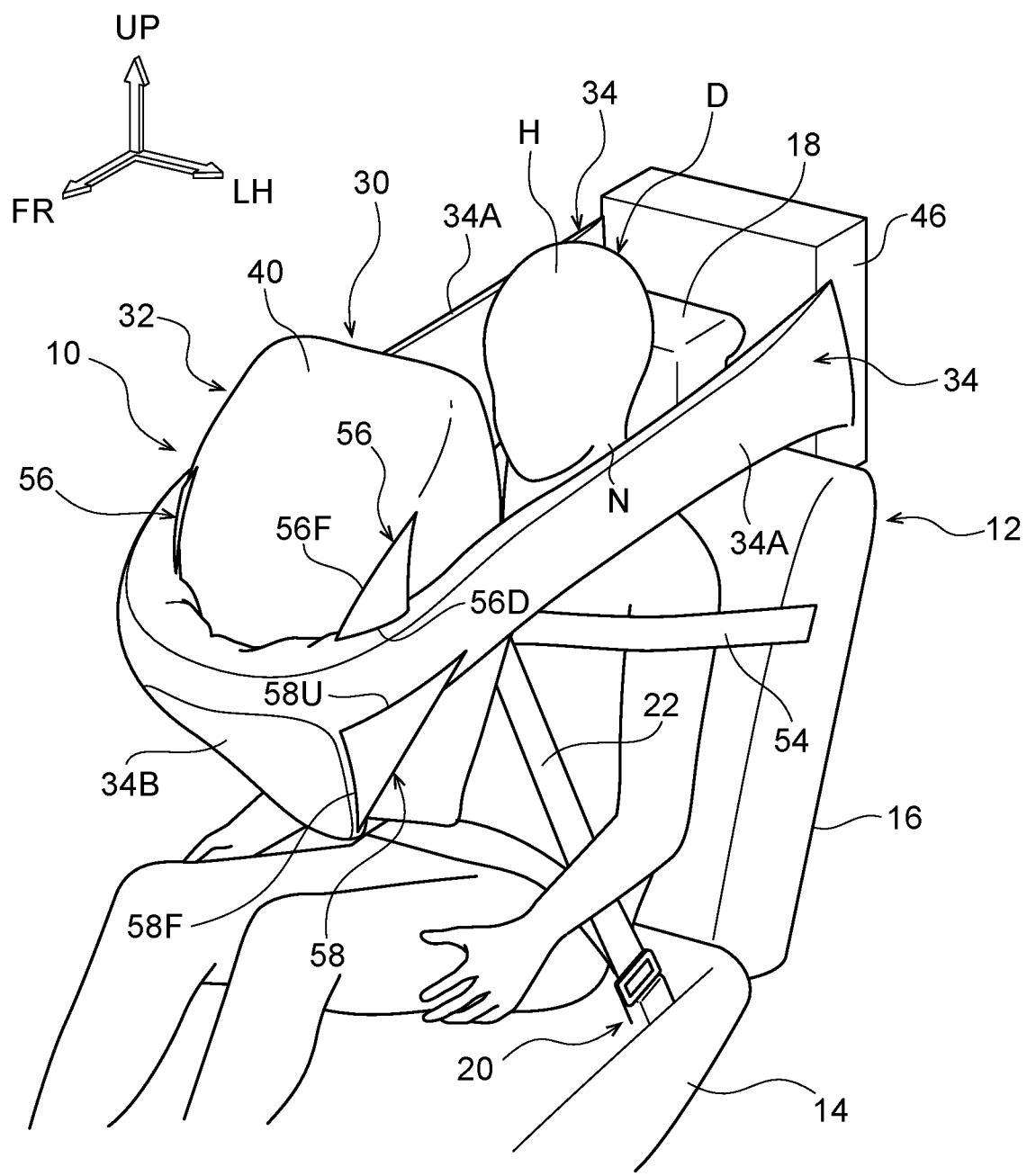
FIG. 1 is a schematic perspective view illustrating an airbag of an airbag device of a passenger protection device according to a first exemplary embodiment in an inflated and deployed state.

Detailed explanation follows regarding exemplary embodiments according to the present disclosure, with reference to the drawings. Note that for ease of explanation, in the drawings an arrow UP indicates an upward direction of a vehicle and a vehicle seat, an arrow FR indicates a forward direction of a vehicle and a vehicle seat, an arrow RH indicates a right direction of a vehicle and a vehicle seat, and an arrow LH indicates a left direction of a vehicle and a vehicle seat. Thus in the following description, unless stated otherwise, reference to up and down, front and rear, and left and right directions indicate up and down, front and rear, and left and right directions of a vehicle and a vehicle seat. Moreover, a left-right direction has the same definition as a vehicle width direction and a seat width direction.

First Exemplary Embodiment

First description follows regarding a first exemplary embodiment. As illustrated in FIG. 1, a passenger protection device 10 according to the first exemplary embodiment is configured including a vehicle seat 12 and an airbag device 30. The vehicle seat 12 is a front seat or a rear seat of a vehicle (automobile). In this example the vehicle seat 12 is a rear seat and not a front seat 13 (see FIG. 5 to FIG. 7). The vehicle seat 12 includes a seat cushion 14, a seatback 16 rotatably provided to a rear edge of the seat cushion 14, and a headrest 18 provided to an upper edge of the seatback 16 so as to be capable of being raised and lowered.

Note that in FIG. 1 etc., a state is illustrated in which a crash test dummy (person dummy) D is seated on the seat cushion 14 of the vehicle seat 12, as a model of a passenger (seated person) to be protected. The dummy D is, for example, an America male adult 50 percentile (AM50) head-on collision test dummy (Hybrid III). The dummy D is seated in a standard seated posture as determined by the crash test method, and the vehicle seat 12 is positioned at a standard installation position corresponding to the seated posture. For ease of explanation, the person dummy D will be hereafter be called "passenger D".

Figure 2:
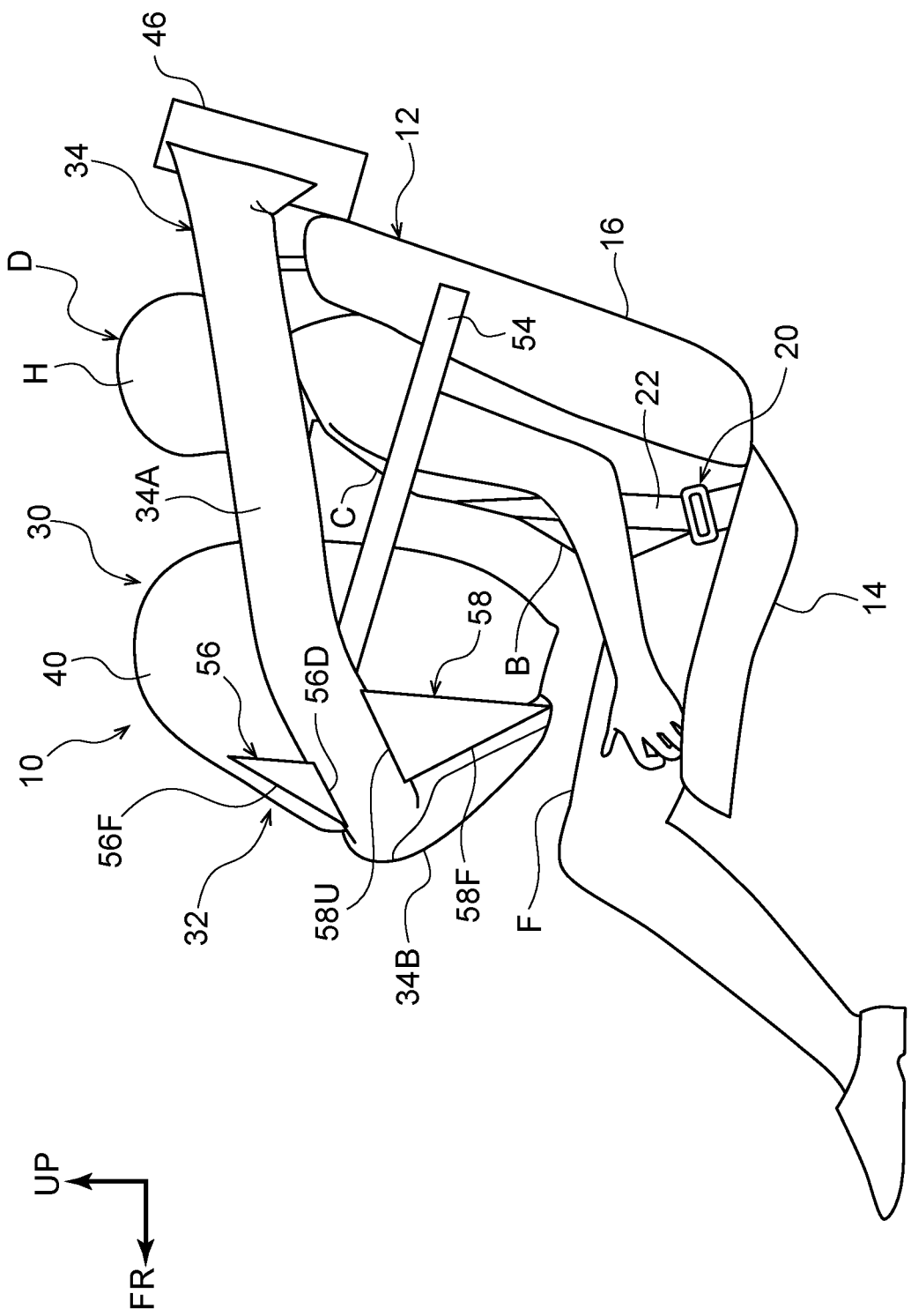
FIG. 2 is a schematic side view illustrating an airbag of an airbag device of a passenger protection device according to the first exemplary embodiment in an inflated and deployed state with respect to a passenger.

As illustrated in FIG. 1 and FIG. 2, the passenger D seated on the seat cushion 14 of the vehicle seat 12 is configured so as to be restrained in the vehicle seat 12 by a seatbelt 22 provided to a seatbelt device 20. The seatbelt device 20 is a three-point seatbelt device, and is a so-called seat-attached seatbelt device in which a non-illustrated retractor and anchor, and a buckle, are each provided to the vehicle seat 12.

The airbag device 30 includes an airbag 32, a pair of inflators 44 (see FIG. 3), and a module case 46). The airbag 32 is normally housed in a folded-up state inside the module case 46 together with the pair of inflators 44. The module case 46 is formed in a hollow cuboidal shape. The module case 46 is disposed at a rear upper portion of the vehicle seat 12 (more specifically at a rear side of the headrest 18 at an upper side of the seatback 16), and is fixed to an upper edge of the seatback 16 or to a non-illustrated vehicle body.

The airbag 32 is configured so as to be supplied with gas from the pair of the inflators 44 and inflated and deployed (deployed and inflated) from the rear side to the front side of the vehicle seat 12 via at an upper side thereof. The airbag 32 includes front-rear chambers 34 and an airbag body 40. The front-rear chambers 34 include a left-right pair of front-rear extension portions 34A that extend along the front-rear direction via left and right sides of the head H of the passenger D, and a coupling portion 34B that connects front end portions of the pair of front-rear extension portions 34A together in a left-right direction. The airbag body 40 inflates and deploys at a rear side of the coupling portion 34B toward the passenger D side (rear side) delayed with respect to the front-rear chamber 34, so as to be disposed between the pair of front-rear extension portions 34A and at a front side of the passenger D.

Figure 3:
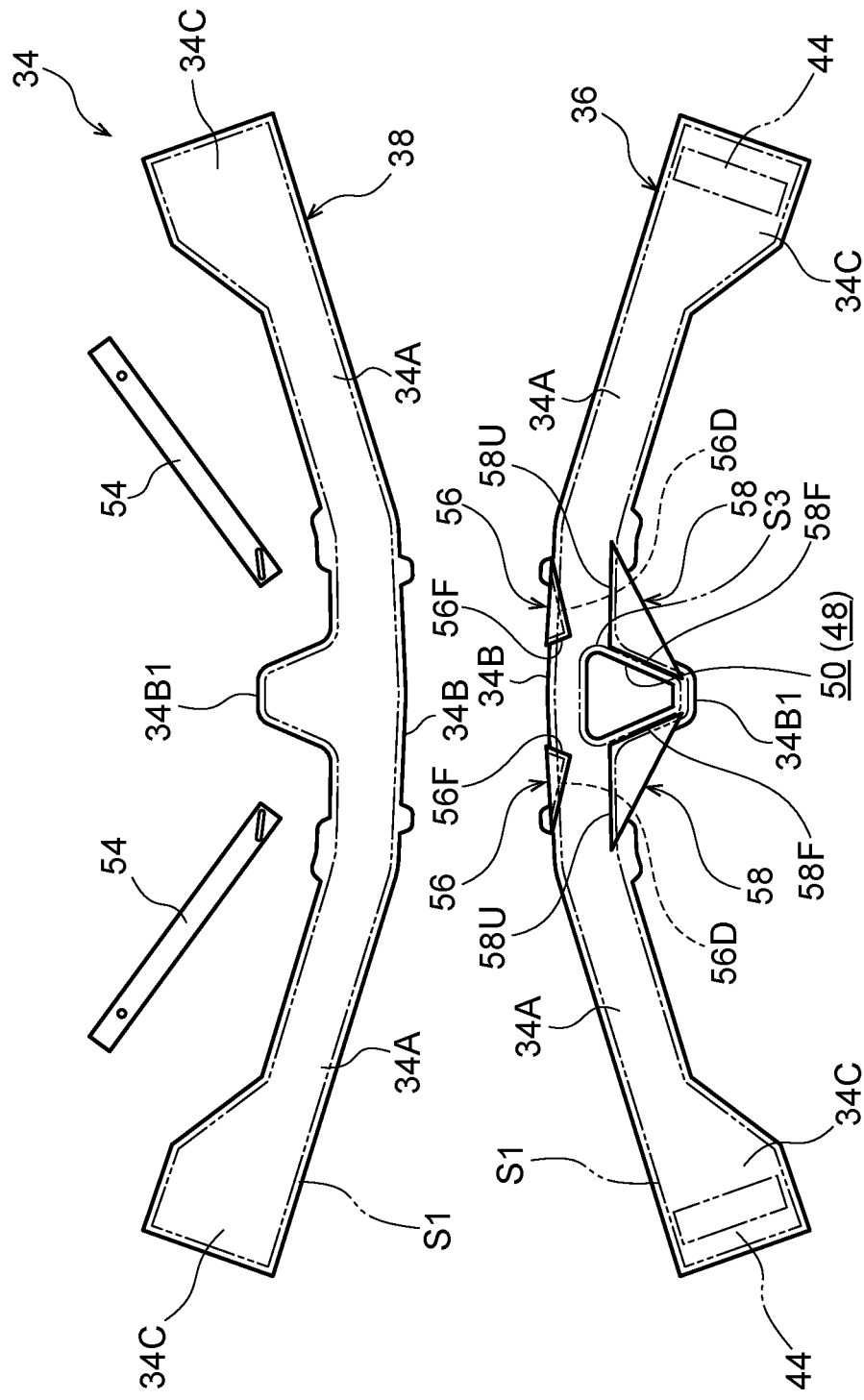
FIG. 3 is an opened out diagram of a front-rear chamber configuring an airbag of an airbag device according to the first exemplary embodiment.
Figure 4:
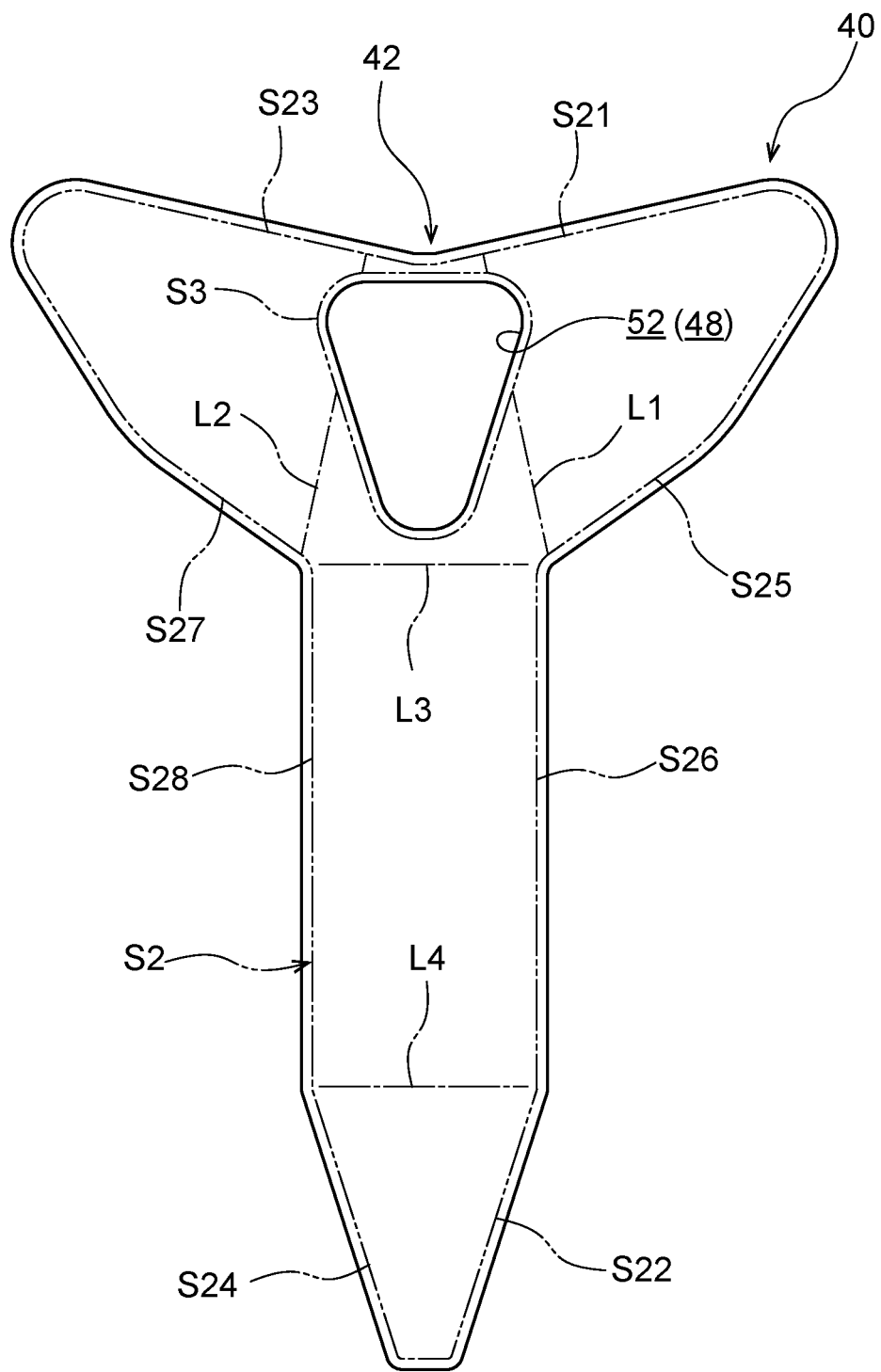
FIG. 4 is an opened out diagram of an airbag body configuring an airbag of an airbag device according to the first exemplary embodiment.

As illustrated in FIG. 3, the front-rear chamber 34 is formed in an elongated bag shape by overlapping two long base cloth 36, 38 and sewing peripheral edges thereof together along a sewn portion S1. Moreover, as illustrated in FIG. 4, the airbag body 40 is formed in a bag shape by folding a single base cloth 42 along four fold lines L1, L2, L3, L4 and sewing along a sewn portion S2.

At the sewn portion S2, a sewing line S21 is sewn to a sewing line S22, a sewing line S23 is sewn to a sewing line S24, a sewing line S25 is sewn to a sewing line S26, and a sewing line S27 is sewn to a sewing line S28. Note that the base cloths 36, 38, 42 are, for example, configured by a polyamide- or polyester-based fabric. One or both of the two base cloths 36, 38 configuring the front-rear chamber 34 is a base cloth that is less extensible than the base cloth 42 configuring the airbag body 40.

As illustrated in FIG. 3, the length direction two end portions (rear end portions of the pair of front-rear extension portions 34A) of the front-rear chamber 34 configure a pair of inflator housing portions 34C housing the left-right pair of inflators 44. Namely, a length direction central portion of the front-rear chamber 34 (a portion connecting the front end portions of the pair of front-rear extension portions 34A together in the left-right direction) is configured by the coupling portion 34B, with the respective front-rear extension portions 34A disposed between the coupling portion 34B and the pair of inflator housing portions 34C.

Although omitted in the drawings, the airbag device 30 includes a control device (ECU) for controlling actuation of the pair of inflators 44. The control device is electrically connected to the pair of inflators 44 and to a non-illustrated crash sensor (including a camera or the like), and is configured so as to be able to detect a head-on collision of the vehicle or foresee that a head-on collision is inevitable (hereafter referred to as "predict"). The control device is configured so as to actuate the pair of inflators 44 when a head-on collision of the vehicle is detected or predicted based on information from the crash sensor.

The pair of inflators 44 are, for example, combustion type cylinder inflators, configured so as to generate gas at high temperature on actuation by the control device during a vehicle head-on collision. Note that the form of vehicle head-on collision for which the control device actuates the inflators 44 includes, in addition to a full frontal head-on collision, an offset head-on collision, such as an oblique collision or a small overlap collision or the like.

The pair of inflator housing portions 34C housing the pair of inflators 44 are disposed separated from each other at the left and right sides inside the module case 46. Each of the inflators 44 housed inside the respective inflator housing portions 34C is disposed with an axial direction orientated along the height direction of the seatback 16. An upper and lower pair of stud bolts (omitted in the drawings) are, for example, provided to each of the inflators 44.

The pair of stud bolts are inserted through the inflator housing portions 34C, the module case 46, and through a non-illustrated frame of the seatback 16, and nuts (omitted in the drawings) are screwed onto the respective stud bolts. The inflator housing portions 34C, the inflators 44, and the module case 46 are thereby fixed to the frame of the seatback 16.

The pair of front-rear extension portions 34A are each formed in an elongated tube shape. An enlarged portion 34B1 is integrally formed at a left-right direction central portion of the coupling portion 34B, with the enlarged portion 34B1 projecting further downward than the left-right direction two end portions of the coupling portion 34B connected to the pair of front-rear extension portions 34A. Namely, the coupling portion 34B is formed as a substantially T-shaped bag in communication with the front-rear extension portions 34A. A configuration is adopted in which a communication hole 48 is provided at a rear side of the left-right direction central portion of the coupling portion 34B including the enlarged portion 34B1.

Namely, a sewn portion S3 is formed by sewing around a periphery of a through hole 50 formed in the base cloth 36 of the front-rear chamber 34 and around a periphery of a through hole 52 (see FIG. 4) formed in the base cloth 42 of the airbag body 40, with the communication hole 48 formed so as to communicate between the through hole 50 and the through hole 52. Note that the through hole 50 and the through hole 52 are, as an example, formed in substantially inverted trapezoidal shapes. This means that the sewn portion S3 is, as an example, also formed in a substantially inverted trapezoidal shape, such that the communication hole 48 communicating the inside of the coupling portion 34B with the inside of the airbag body 40 is positioned at the inside of the sewn portion S3.

The pair of front-rear extension portions 34A, the coupling portion 34B, and the airbag body 40 are normally housed folded up inside the module case 46 with a specific folding pattern, such as roll folding, concertina folding, or the like. A non-illustrated tear line is formed at the module case 46. The tear line is configured so as to rupture on receipt of inflation pressure of the airbag 32 when the airbag 32 is being inflated and deployed. This means that the airbag 32 is able to be inflated and deployed toward the outside of the module case 46 in a sequence of the pair of front-rear extension portions 34A, then the coupling portion 34B, and then the airbag body 40.

The inflated and deployed pair of front-rear extension portions 34A extend in the front-rear direction at the left and right sides of the head H of the passenger D, so as to oppose the head H from the left and right sides thereof, separated from the head H by respective gaps. The front end portions of the inflated and deployed pair of front-rear extension portions 34A are in a state connected together in the left-right direction by the inflated and deployed coupling portion 34B. This means that the front-rear chamber 34 including the pair of front-rear extension portions 34A and the coupling portion 34B is configured in a substantially U-shape open toward the rear in plan view (see FIG. 10, FIG. 12, and FIG. 14).

The airbag body 40 is configured so as to be supplied with gas through the communication hole 48 and inflated and deployed toward the rear side (the passenger D side). Namely, the airbag body 40 is configured so as to be inflated and deployed at the rear side of the coupling portion 34B toward the passenger D side (rear side) delayed with respect to the front-rear chamber 34. The airbag body 40 is thereby configured so as to be able to pass through from the rear side toward the front side via a gap between the head H of the passenger D and a ceiling 28 of a vehicle cabin (see FIG. 5) during inflation and deployment of the front-rear chamber 34.

The inflated and deployed airbag body 40 is configured so as to face toward the head H, the chest C, and the belly B of the passenger D, separated by a gap therefrom in the front-rear direction (see FIG. 2). Note that the airbag body 40 is set with a shape such that when being inflated and deployed, the airbag body 40 is sandwiched between the thighs F and the chest C of the passenger D from an intermediate-stage to a later-stage during passenger restraint.

Moreover, as illustrated in FIG. 1 and FIG. 2, a left and right pair of rear tethers 54 is attached to the airbag 32. The rear tethers 54 are, for example, configured from a polyamide- or polyester-based fabric in elongated belt shapes. The fabric configuring the rear tethers 54 is configured so as to be less extensible than the base cloths 36, 38 configuring the front-rear chamber 34 and the base cloth 42 configuring the airbag body 40. The extensibility is adjusted by the substance, thickness, and the like of the fabric.

Each of one-end portions of the pair of rear tethers 54 is attached to the airbag body 40 by being sewed to the respective wall faces on the left and right sides at a front side of a lower portion of the airbag body 40 inflated and deployed further downward than the front-rear chamber 34. Each of the other-end portions of the pair of rear tethers 54 is attached to respective side portions of the seatback 16 (or to a non-illustrated vehicle body at a rear side of the passenger D). Thus in an inflated and deployed state of the airbag 32, the pair of rear tethers 54 extend obliquely rearward and downward at a lower side of the pair of front-rear extension portions 34A.

Namely, the pair of rear tethers 54 adopt an inclined orientation inclined facing rearward and downward in side view. This results in a configuration in which, during restraint of the passenger D by the airbag 32, the airbag body 40 is pulled (drawn) relatively rearward and downward by the pair of rear tethers 54, and the airbag body 40 and front portions of the pair of front-rear extension portions 34A are pulled relatively rearward and downward about a center of rotation of the module case 46.

Moreover, as illustrated in FIG. 1 and FIG. 2, front-upper tethers 56 serving as a left and right pair of upper tethers, and front-lower tethers 58 serving as a left-right pair of lower tethers, are attached to the airbag 32. The front-upper tethers 56 and the front-lower tethers 58 are, for example, configured from a polyamide- or polyester-based fabric as planar tethers having substantially triangular shapes in side view with left-right symmetrically shapes. The fabric configuring the front-upper tethers 56 and the front-lower tethers 58 is configured so as to be less extensible than the base cloths 36, 38 configuring the front-rear chamber 34 and the base cloth 42 configuring the airbag body 40. The extensibility is adjusted by the substance, thickness, and the like of the fabric.

The pair of front-upper tethers 56 are configured so as to couple wall faces at the left and right sides of a front side of an upper portion of the airbag body 40 inflated and deployed further upward than the front-rear chamber 34, to respective front portions of the pair of front-rear extension portions 34A. Namely, peripheral edge portions 56F on the front side of the pair of front-upper tethers 56 are sewn to respective wall faces of the left and right sides of the front side of the upper portion of the airbag body 40 inflated and deployed further upward than the front-rear chamber 34. Peripheral edge portions 56D on a lower side of the pair of front-upper tethers 56 are sewn to the respective front portions of the pair of respective front-rear extension portions 34A.

The pair of front-lower tethers 58 are configured so as to couple left and right end portions of the coupling portion 34B to respective front portions of the pair of front-rear extension portions 34A. Namely, peripheral edge portions 58F at the front side of the pair of front-lower tethers 58 are sewn to respective left and right end portions of the coupling portion 34B. Peripheral edge portions 58U at upper sides of the pair of front-lower tethers 58 are sewn to respective front portions of the pair of front-rear extension portions 34A.

Next, description follows regarding operation and effects of the airbag device 30 and the passenger protection device 10 according to the first exemplary embodiment configured as described above.

The pair of inflators 44 are actuated under control from the control device when a vehicle head-on collision is detected (or predicted) by the crash sensor. Namely, gas is ejected from each of the inflators 44 into the pair of inflator housing portions 34C. The gas generated inside the pair of inflator housing portions 34C flows to the coupling portion 34B side via the pair of front-rear extension portions 34A, and is supplied into the airbag body 40 via the communication hole 48.

Figure 5:
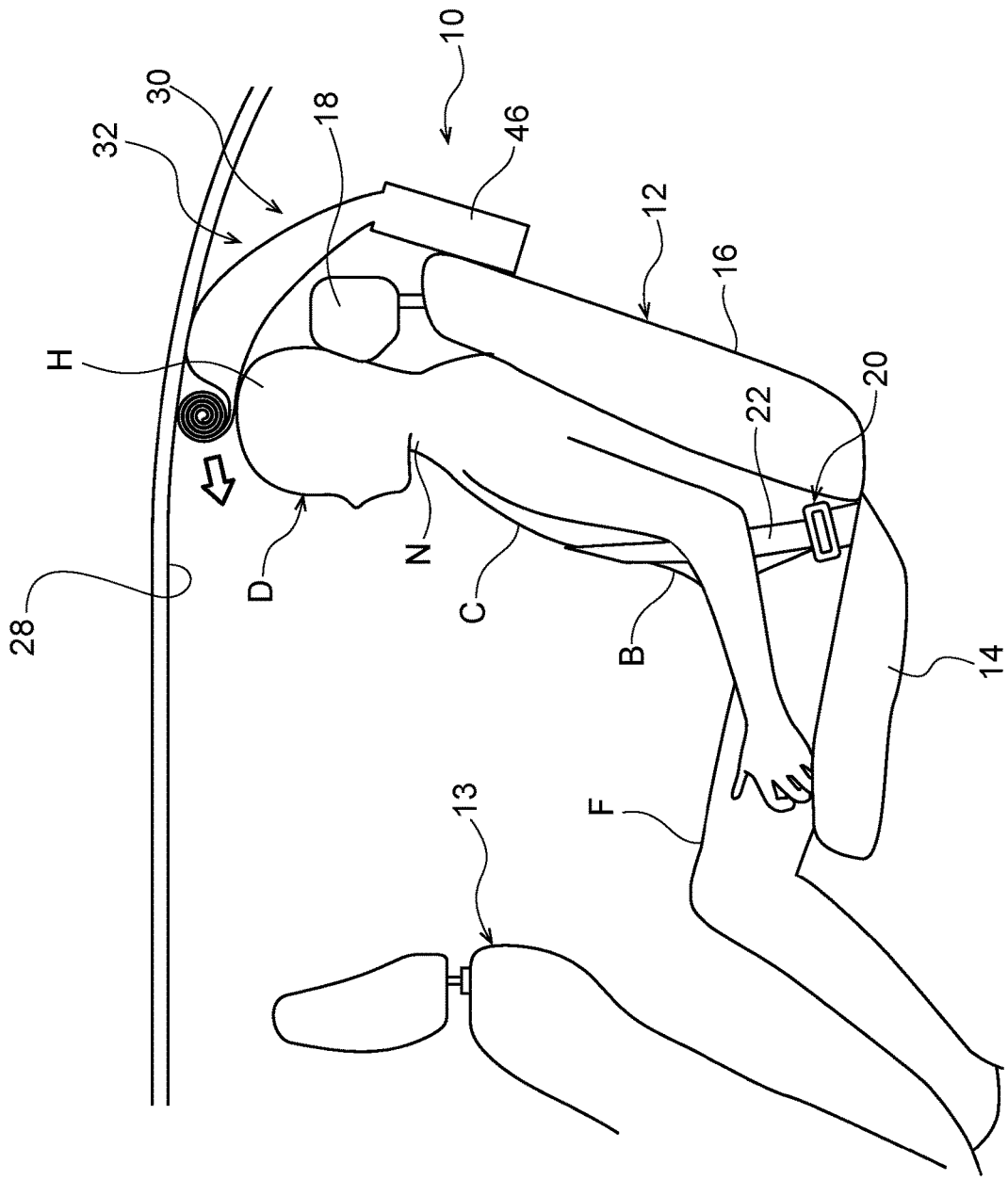
FIG. 5 is a schematic side view illustrating an airbag of an airbag device according to the first exemplary embodiment in a state when passing through a gap between the head of a passenger and a ceiling of a vehicle cabin while being inflated and deployed.

More specifically first, as illustrated in FIG. 5, the tear line of the module case 46 ruptures under receipt of inflation pressure of the airbag 32, and the airbag 32 inflates and deploys from the rear side of the vehicle seat 12 toward the front side via an upper side thereof (as indicated by an arrow). Namely, the airbag 32 deploys from a rear upper portion of the seatback 16 toward the front side via an upper side of the headrest 18 and an upper side of the head H of the passenger D.

Figure 6:
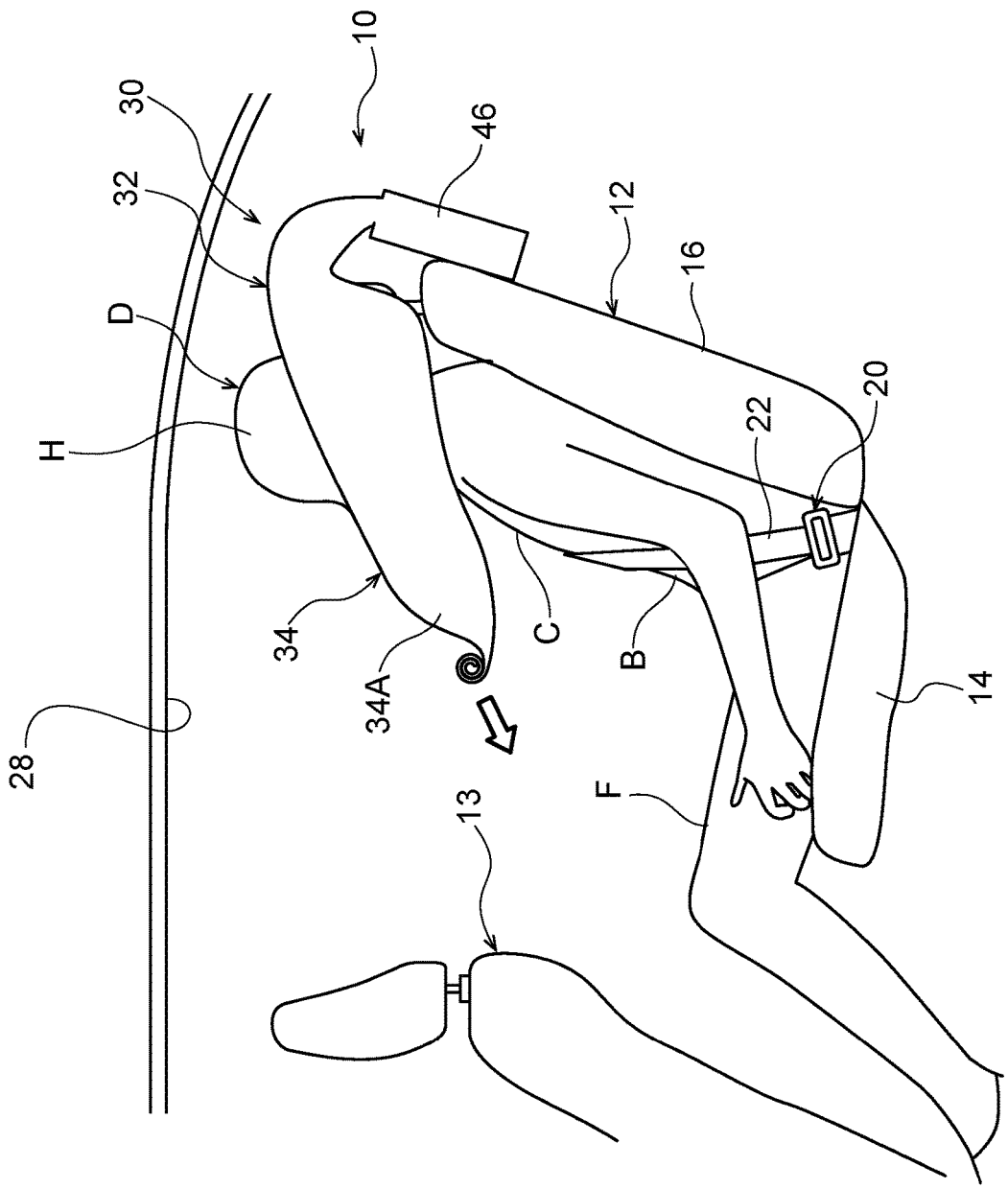
FIG. 6 is a schematic side view illustrating an airbag of an airbag device according to the first exemplary embodiment in a state when passing the shoulders of a passenger while being inflated and deployed.
Figure 7:
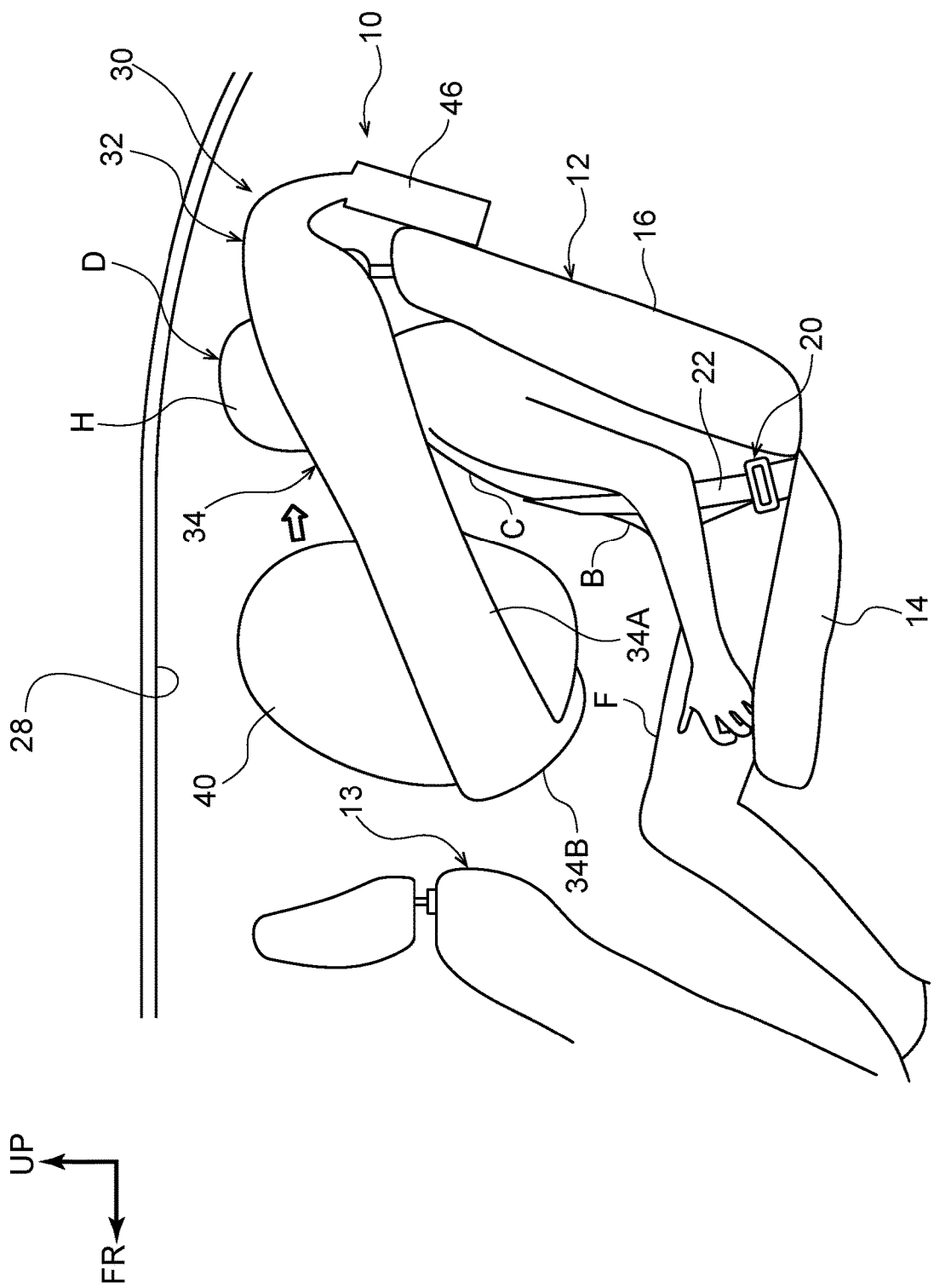
FIG. 7 is a schematic side view illustrating an airbag of an airbag device according to the first exemplary embodiment in a state when being disposed at a front side of the passenger while being inflated and deployed.

Next, as illustrated in FIG. 6, the head H of the passenger D is inserted relatively into a space surrounded by the front-rear extension portions 34A of the pair of front-rear chambers 34 and by the airbag body 40 (see FIG. 7). Namely, the front-rear extension portions 34A of the pair of front-rear chambers 34 are deployed toward the front side (as indicated by the arrow) while being disposed at the left and right sides of the head H of the passenger D.

Then, as illustrated in FIG. 7, the airbag body 40 is inflated and deployed toward the passenger D side (rear side as indicated by the arrow therein) by being supplied with gas through the coupling portion 34B connecting the front end portions of the front-rear extension portions 34A of the pair of front-rear chambers 34 together in the left-right direction. Namely, as illustrated in FIG. 2, the airbag body 40 is disposed between the pair of front-rear chambers 34 and at the front side of the passenger D.

Note that during inflation and deployment of the airbag body 40, the pair of front-upper tethers 56 respectively couple left-right side locations at the front side of an upper portion of the airbag body 40 to the front portions of the pair of front-rear extension portions 34A. The pair of front-upper tethers 56 enable unintended upward displacement (rotation) of the airbag body 40 with respect to the front-rear chamber 34 about the coupling portion 34B to be suppressed when the airbag body 40 (the airbag 32) has been completely inflated and deployed.

Moreover, during inflation and deployment of the airbag body 40, the pair of front-lower tethers 58 couple locations at the left-right sides of a front side of the lower portion of the airbag body 40, through the coupling portion 34B, to the front portions of the pair of front-rear extension portions 34A. The pair of front-lower tethers 58 are able to suppress unintended downward displacement (rotation) of the airbag body 40 with respect to the front-rear chamber 34 about the coupling portion 34B when the airbag body 40 (the airbag 32) has been completely inflated and deployed.

Furthermore, the pair of rear tethers 54 also extend obliquely rearward and downward at a lower side of the pair of front-rear extension portions 34A when the airbag 32 has been completely inflated and deployed. Namely, the pair of rear tethers 54 limit the airbag body 40 from moving obliquely forward and upward. This accordingly enables the airbag 32 to be suppressed from swinging in the height direction and in the front-rear direction (contributes to the stability of the deployment behavior of the airbag body 40).

In this state, the passenger D who has moved toward the front side under inertia from the impact of the vehicle head-on collision is restrained by the airbag body 40. More specifically, during restraint of the passenger D, the front-rear chambers 34 (the front-rear extension portions 34A) are stretched toward the front side by the passenger D moving toward the front side. Then the airbag body 40 is compression deformed toward the front side by being pressed toward the front side by the passenger D.

This accordingly enables the energy absorption performance of the airbag body 40 to be improved. Namely, in cases in which both the front-rear chamber 34 and the airbag body 40 receive tension load, the load from the airbag body 40 imparted to the passenger D increases continuously with time, however the load imparted to the passenger D can be decreased somewhat by compression deformation of the airbag body 40.

Moreover, the airbag body 40 is set with a shape so as to be sandwiched between the thighs F and the chest C of the passenger D from the intermediate-stage to the later-stage during passenger restraint by the airbag 32, and so this enables contact with the upper body of the passenger D over a wide surface area. The load from the airbag body 40 imparted to the passenger D can accordingly be reduced significantly.

The airbag body 40 is also inflated and deployed toward the passenger D side at the rear side of the coupling portion 34B after the inflation and deployment of the front-rear chamber 34, and so a gap between the airbag body 40 and the passenger D becomes small. The passenger D is thereby restrained at an early-stage by the airbag body 40, enabling the initial-stage passenger D restraint performance by the airbag body 40 to be improved.

Moreover, gas is supplied from the inflators 44 into the airbag body 40 through the communication hole 48 formed at the rear side of the left-right direction central portion of the coupling portion 34B in an inflated and deployed state of the front-rear chamber 34. Namely, gas that was ejected from the inflators 44 and flowed into the pair of front-rear extension portions 34A of the front-rear chamber 34 and the coupling portion 34B is supplied into the airbag body 40 via the communication hole 48.

This thereby enables the airbag body 40 to be inflated and deployed sufficiently delayed with respect to the front-rear chamber 34. Namely, the airbag body 40 can be easily inflated and deployed toward the rear side after passing from the rear side to the front side via the narrow gap between the head H of the passenger D and the ceiling 28 of the vehicle cabin due to the inflation and deployment of the front-rear chamber 34 (see FIG. 5 to FIG. 7). This enables the airbag body 40 to be prevented from getting stuck in the narrow gap, enabling a deployment malfunction with the airbag 32 to be suppressed or prevented from occurring.

The front-upper tethers 56 and the front-lower tethers 58 are formed as planar tethers having substantially triangular shapes in side view with left-right symmetrical shapes. Namely, gaps between the front portions of the front-rear chambers 34 (the front-rear extension portions 34A) and a lower portion at a front side of the airbag body 40 further toward a lower side thereof are covered by the front-lower tethers 58. Gaps between the front portions of the front-rear chamber 34 (the front-rear extension portions 34A) and an upper portion at a front side of the airbag body 40 further toward an upper side thereof are covered by the front-upper tethers 56.

This means that even when the vehicle has had an offset collision or an oblique collision and the passenger D has moved obliquely toward the front side, the airbag 32 can, by the front-lower tethers 58, suppress or prevent at least the head H of the passenger D from entering into the gaps between the front portions of the front-rear chamber 34 (the front-rear extension portions 34A) and the lower portion of the front side of the airbag body 40 (twisting of the neck N of the passenger D due to entering into the gaps (see FIG. 1 and FIG. 5)) during a latter half of restraining the passenger D. This thereby enables the passenger D to be appropriately restrained.

Similarly, even when the vehicle has had an offset collision or an oblique collision and the passenger D has moved obliquely toward the front side, the airbag 32 can, by the front-upper tethers 56, suppress or prevent at least the head H of the passenger D from entering into the gaps between the front portions of the front-rear chamber 34 (the front-rear extension portions 34A) and the upper portion of the front side of the airbag body 40 (twisting of the neck N of the passenger D due to entering into the gaps) during a latter half of restraining the passenger D. This thereby enables the passenger D to be appropriately restrained.

Second Exemplary Embodiment

Next, description follows regarding a second exemplary embodiment. Note that the same reference numerals will be appended to locations equivalent to those of the first exemplary embodiment and detailed explanation thereof will be omitted (including of common operation and effects).

Figure 8:
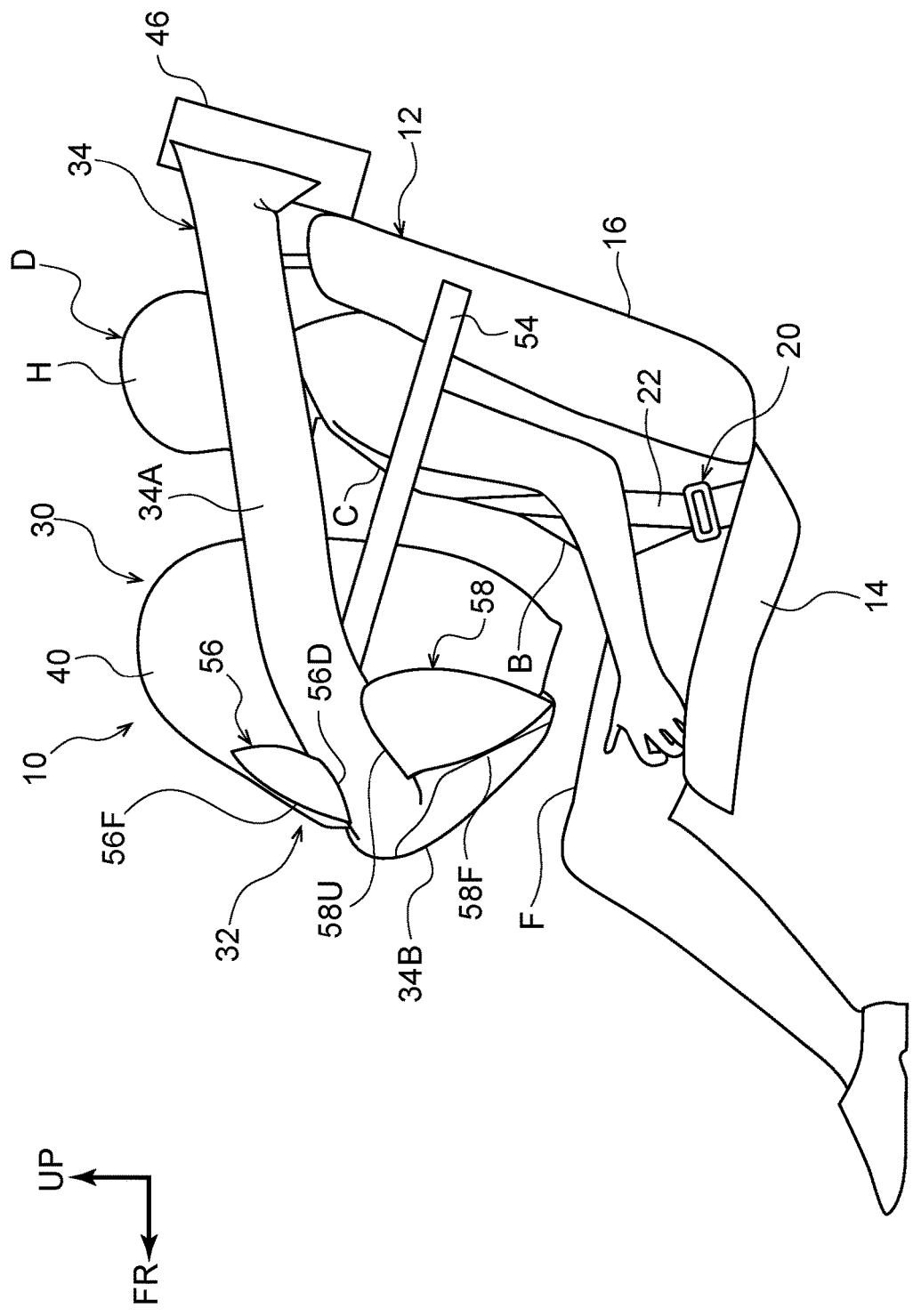
FIG. 8 is a schematic side view illustrating an airbag of an airbag device according to a second exemplary embodiment in an inflated and deployed state with respect to a passenger.
Figure 9:
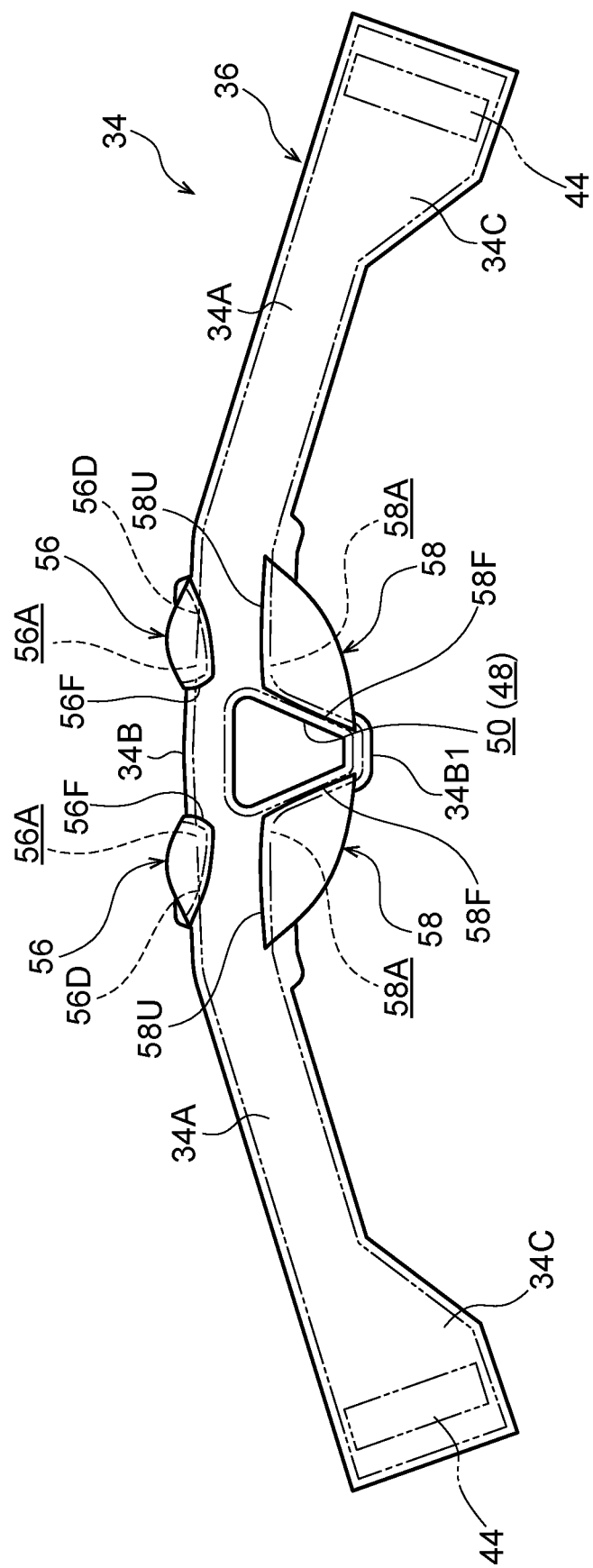
FIG. 9 is a opened out diagram of a front-rear chamber configuring an airbag of an airbag device according to the second exemplary embodiment.

As illustrated in FIG. 8 and FIG. 9, the second exemplary embodiment differs from the first exemplary embodiment in that the front-upper tethers 56 and the front-lower tethers 58 are configured from, for example, a polyamide- or polyester-based fabric in bag shapes having substantially triangular shapes in side view with left-right symmetrical shapes. Namely, the front-upper tethers 56 configure upper inflating portions, and the front-lower tethers 58 configure lower inflating portions.

The fabric configuring the front-upper tethers 56 serving as the upper inflating portions and the front-lower tethers 58 serving as the lower inflating portions, is configured so as to be less extensible than the base cloths 36, 38 configuring the front-rear chamber 34 and the base cloth 42 configuring the airbag body 40. The extensibility is adjusted by the substance, thickness, and the like of the fabric.

Configuration is such that for peripheral edge portions 56D on a lower side of the pair of front-upper tethers 56 respectively sewed to front portions of the pair of front-rear extension portions 34A, the peripheral edge portions 56D are not sewn thereto at seat width direction inside end portions thereof. Namely, at the front portions of the pair of front-rear extension portions 34A for portions corresponding to the seat width direction inside end portion of the peripheral edge portions 56D on the lower side of the front-upper tethers 56, one of the base cloths configuring the front-upper tethers 56 and the base cloth 36 of the front-rear chambers 34 are sewn together, and the other of the base cloths configuring the front-upper tethers 56 and the base cloth 38 of the front-rear chamber 34 are sewn together. However, the base cloth 36 and the base cloth 38 are not sewn together at these portions. This results in a configuration in which upper communication holes 56A are formed at these portions.

The upper communication holes 56A result in a configuration in which gas is supplied from the airbag body 40 into the front-upper tethers 56 through the coupling portion 34B and the front portions of the pair of front-rear extension portions 34A at least during restraint of the passenger D by the airbag body 40. The size (opening surface area) of the upper communication holes 56A is set so as to be considerably smaller than the size (opening surface area) of the communication hole 48.

Moreover, a configuration is adopted in which, for peripheral edge portions 58U on an upper side of the pair of front-lower tethers 58 respectively sewed to front portions of the pair of front-rear extension portions 34A, the peripheral edge portions 58U are not sewn thereto at seat width direction inside end portions thereof. Namely, at the front portions of the pair of front-rear extension portions 34A, for portions corresponding to the seat width direction inside end portions of the peripheral edge portions 58U on the upper side of the front-lower tethers 58, one of the base cloths configuring the front-lower tethers 58 and the base cloth 36 of the front-rear chambers 34 are sewn together, and the other of the base cloths configuring the front-lower tethers 58 and the base cloth 38 of the front-rear chamber 34 are sewn together. However, the base cloth 36 and the base cloth 38 are not sewed together at these portions. This results in a configuration in which lower communication holes 58A are formed at these portions.

The presence of the lower communication holes 58A results in a configuration in which gas is supplied from the airbag body 40 into the front-lower tethers 58 through the coupling portion 34B and the front portions of the pair of front-rear extension portions 34A at least during restraint of the passenger D by the airbag body 40. The size (opening surface area) of the lower communication holes 58A is set so as to be considerably smaller than the size (opening surface area) of the communication hole 48.

In the airbag 32 configured as described above, the front-lower tethers 58 are configured as bag shaped tethers (lower inflation portions). Namely, gaps between front portions of the front-rear chamber 34 (front-rear extension portions 34A) and lower portions at the front side of the airbag body 40 are covered by the inflated and deployed front-lower tethers 58. This means that even when the vehicle has had an offset collision or an oblique collision and the passenger D has moved obliquely toward the front side, the airbag 32 can, by the bag shaped front-lower tethers 58, suppress or prevent at least the head H of the passenger D from entering into these gaps during the latter half of restraining the passenger D (spanning from the intermediate-stage to the later-stage). The passenger D can accordingly be appropriately restrained.

Similarly, in the airbag 32 the front-upper tethers 56 are configured as bag shaped tethers (upper inflating portions). Namely, gaps between front portions of the front-rear chamber 34 (front-rear extension portions 34A) and upper portions at the front side of the airbag body 40 are covered by the inflated and deployed front-upper tethers 56. This means that even when the vehicle has had an offset collision or an oblique collision and the passenger D has moved obliquely toward the front side, the airbag 32 can, by the bag shaped front-upper tethers 56, suppress or prevent at least the head H of the passenger D from entering into these gaps during the latter half of restraining the passenger D (spanning from the intermediate-stage to the later-stage). The passenger D can accordingly be appropriately restrained.

The opening surface area of the lower communication holes 58A is smaller than the opening surface area of the communication hole 48. This means that even though the configuration adopted is one in which the bag shaped front-lower tethers 58 (lower inflating portions) are provided, the deployment of the airbag body 40 is not delayed. Namely, a malfunction in which the front-lower tethers 58 inflate and deploy prior to the airbag body 40 being inflated and deployed can be suppressed or prevented from occurring.

Similarly, the opening surface area of the upper communication holes 56A is smaller than the opening surface area of the communication hole 48. This means that even though the configuration adopted is one in which the bag shaped front-upper tethers 56 (upper inflating portions) are provided, the deployment of the airbag body 40 is not delayed. Namely, a malfunction in which the front-upper tethers 56 inflate and deploy prior to the airbag body 40 being inflated and deployed can be suppressed or prevented from occurring.

Note that at least a single or plural seams (sewn portions) may be formed at each of the bag shaped front-lower tethers 58 (lower inflating portions) so as to be able to adjust a capacity of the front-lower tethers 58 (lower inflating portions). This thereby enables the passenger protection performance to be improved even more. The front-lower tethers 58 (lower inflating portions) and the front-upper tethers 56 (upper inflating portions) may, for example, be configured so as to only be provided at the one side where a curtain airbag (omitted in the drawings) is not provided (i.e. the opposite side to a side door side).

Third Exemplary Embodiment

Next, description follows regarding a third exemplary embodiment. Note that the same reference numerals will be appended to locations equivalent to those of the first exemplary embodiment and the second exemplary embodiment and detailed explanation thereof will be omitted (including of common operation and effects).

Figure 10:
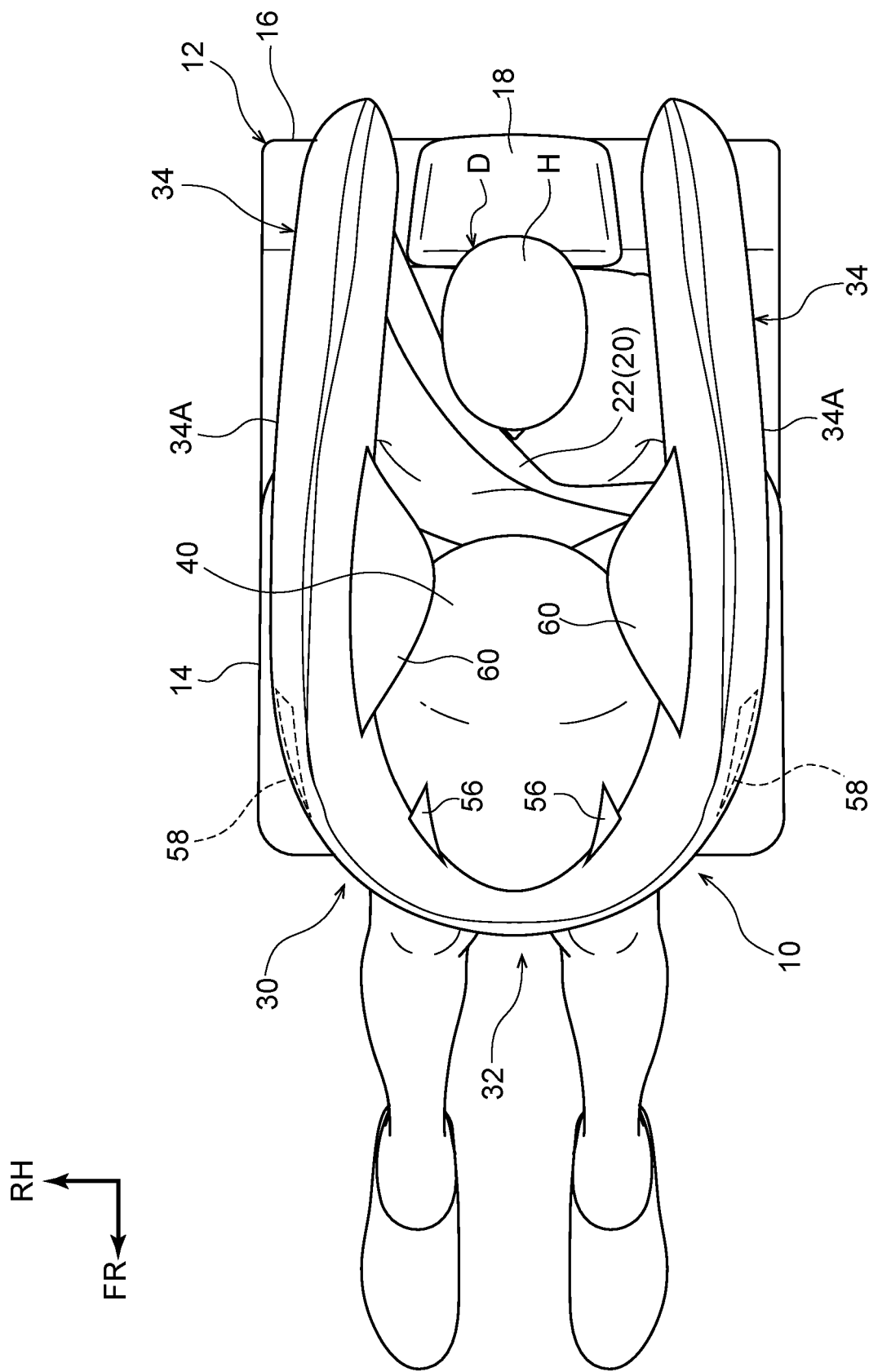
FIG. 10 is a schematic plan view illustrating an airbag of an airbag device according to a third exemplary embodiment in an inflated and deployed state with respect to a passenger.

As illustrated in FIG. 10, the third exemplary embodiment differs from the first exemplary embodiment in that bulge portions 60 having a convex shape projecting toward the seat width direction inside are integrally formed at front portions of inner faces of the pair of front-rear extension portions 34A (front-rear chamber 34) opposing each other in the left-right direction, so as to fill gaps relative to the airbag body 40. The bulge portions 60 project in substantially circular arc shapes in plan view and front view, with the maximum projection height thereof being a height capable of respectively abutting respective wall faces at the left and right direction sides of the airbag body 40, or pressing the wall faces with a specific pressure.

Figure 11A:
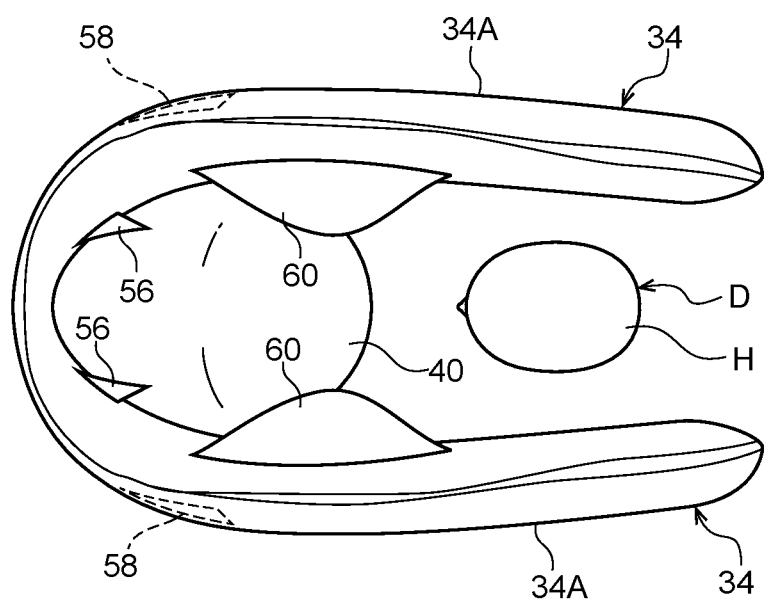
FIG. 11A is an explanatory diagram illustrating a plan view of a process up to a passenger being restrained by an airbag of an airbag device according to the third exemplary embodiment.
Figure 11B:
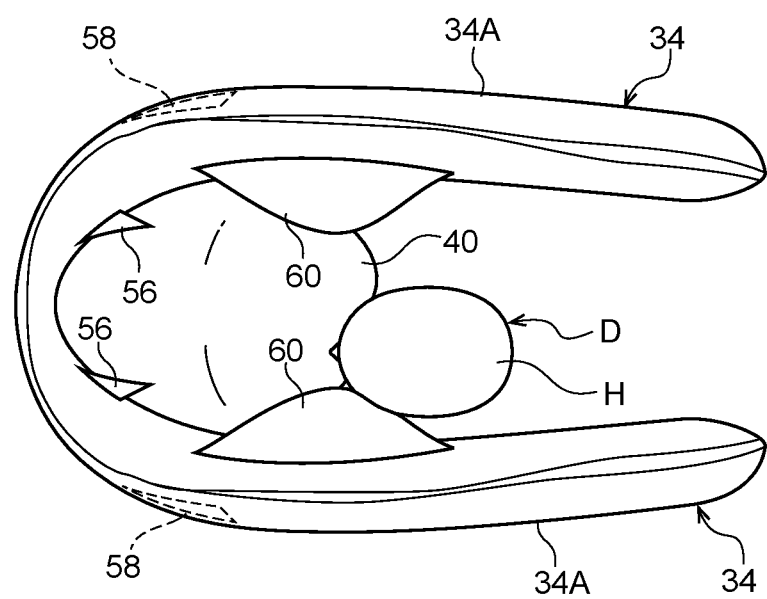
FIG. 11B is an explanatory diagram illustrating a plan view of a process up to a passenger being restrained by an airbag of an airbag device according to the third exemplary embodiment.
Figure 11C:
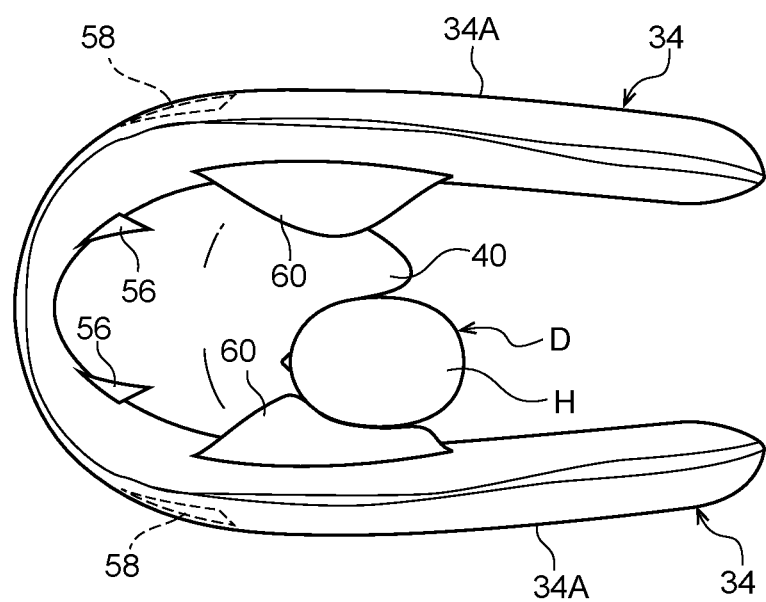
FIG. 11C is an explanatory diagram illustrating a plan view of a process up to a passenger being restrained by an airbag of an airbag device according to the third exemplary embodiment.

This means that even when the vehicle has had an offset collision or an oblique collision and at least the head H of the passenger D has moved obliquely toward the front side, as illustrated in FIG. 11A and FIG. 11B, the airbag 32 configured in this manner can, by the bulge portions 60, enable suppression or prevention of at least the head H of the passenger D from entering gaps between the front portions of the front-rear chamber 34 (front-rear extension portions 34A) and the airbag body 40 (twisting of the neck N of the passenger D due to entering into the gap) during the latter half of restraining the passenger D (spanning from the intermediate-stage to the later-stage) as illustrated in FIG. 11C. This thereby enables the passenger D to be appropriately restrained.

Moreover, due to providing the bulge portions 60, the amount of head movement of the passenger D can be reduced in the front-rear direction and the left-right direction. This thereby enables ingression of the head H as far as the band shaped front-lower tethers (omitted in the drawings) to be physically suppressed or prevented by the bulge portions 60 even in cases in which, for example, the front-lower tethers 58 are band shaped tethers having a specific width. Namely, the neck N of the passenger D can be suppressed or prevented from hitting (snagging on) such band shaped front-lower tethers by the bulge portions 60.

Fourth Exemplary Embodiment

Next, description follows regarding a fourth exemplary embodiment. Note that the same reference numerals will be appended to locations equivalent to those of the first exemplary embodiment to the third exemplary embodiment and detailed explanation thereof will be omitted (including of common operation and effects)

Figure 12:
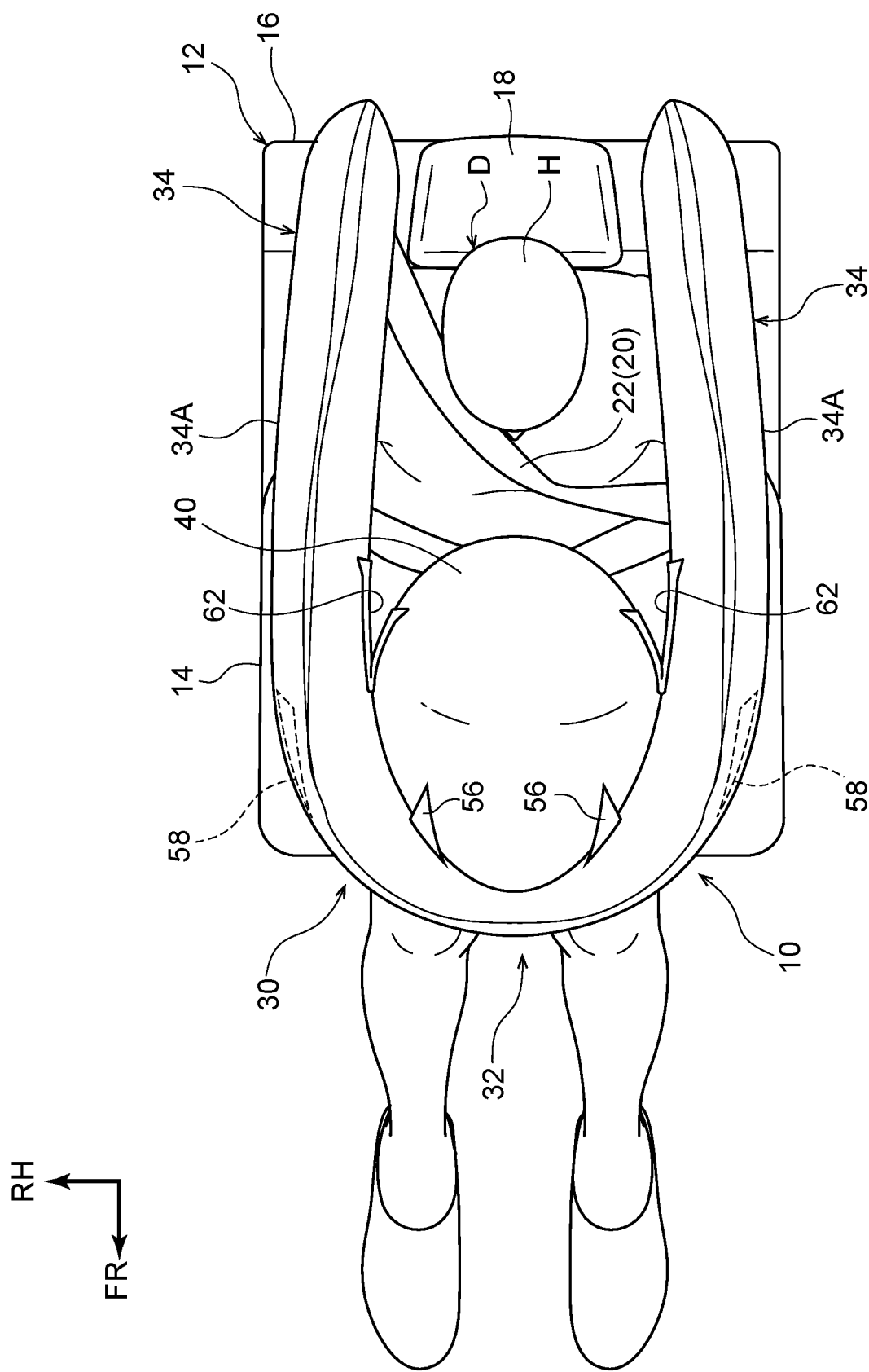
FIG. 12 is a schematic plan view illustrating an airbag of an airbag device according to a fourth exemplary embodiment in an inflated and deployed state with respect to a passenger.

As illustrated in FIG. 12, the fourth exemplary embodiment differs from the first exemplary embodiment in that a pair of guide cloths 62 are provided so as to cover gaps between the front portions of the pair of front-rear extension portions 34A and the airbag body 40, with the guide cloths 62 including one-end portions sewn to respective front portions on the inside faces of the pair of front-rear extension portions 34A (front-rear chamber 34) opposing each other in the left-right direction and other-end portions sewn to the wall faces on the left and right sides of the airbag body 40. The guide cloths 62 are formed by a fabric similar to that of the base cloths 36, 38, 42, and a width thereof in the height direction is substantially the same as the width of the front-rear extension portions 34A in the height direction.

Figure 13A:
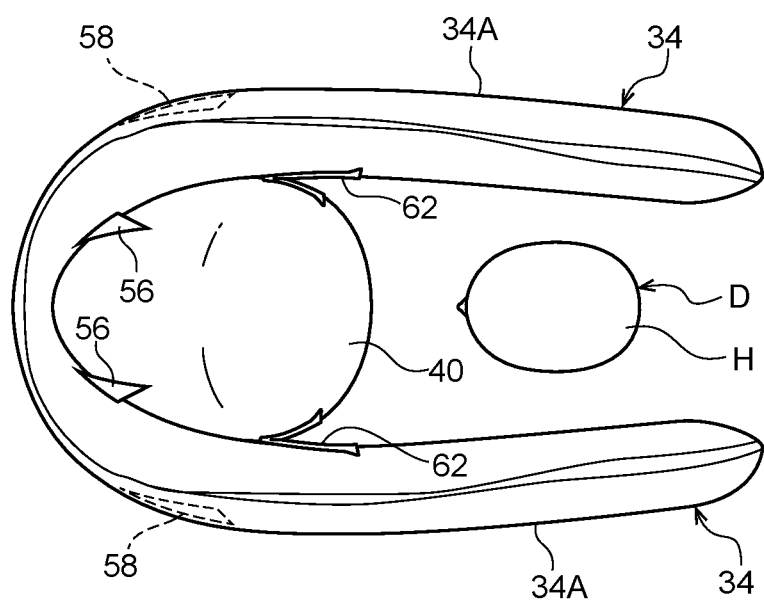
FIG. 13A is an explanatory diagram illustrating a plan view of a process up to a passenger being restrained by an airbag of an airbag device according to the fourth exemplary embodiment.
Figure 13B:
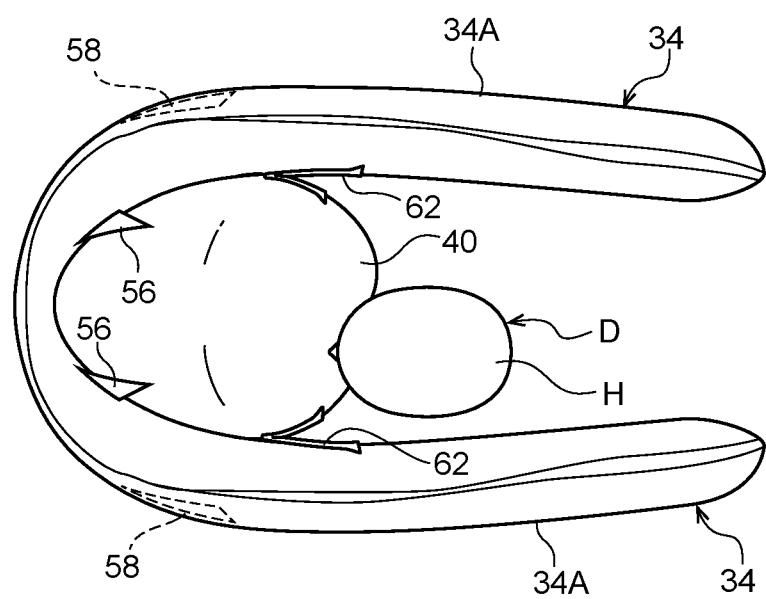
FIG. 13B is an explanatory diagram illustrating a plan view of a process up to a passenger being restrained by an airbag of an airbag device according to the fourth exemplary embodiment.
Figure 13C:
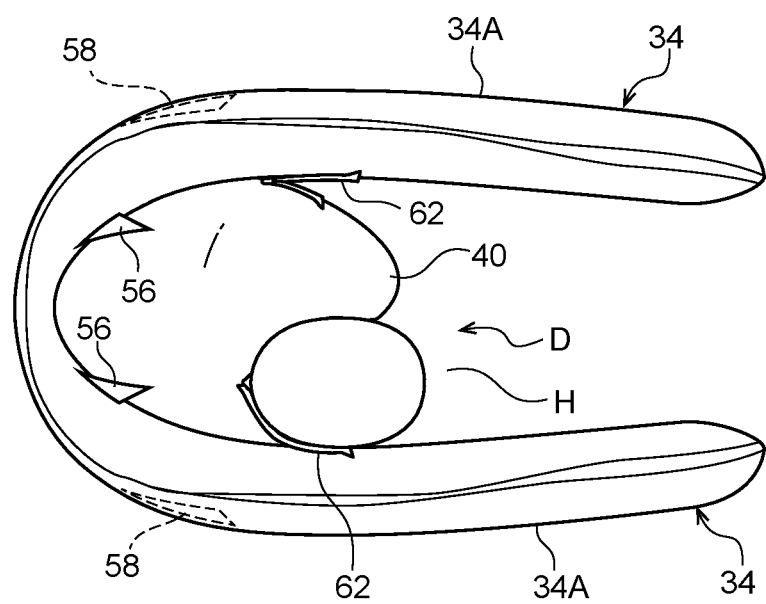
FIG. 13C is an explanatory diagram illustrating a plan view of a process up to a passenger being restrained by an airbag of an airbag device according to the fourth exemplary embodiment.

This means that even when the vehicle has had an offset collision or an oblique collision and at least the head H of the passenger D has moved obliquely toward the front side, as illustrated in FIG. 13A and FIG. 13B, the airbag 32 configured in this manner can, by the guide cloths 62, enable suppression or prevention of at least the head H of the passenger D from entering gaps between the front portions of the front-rear chamber 34 (front-rear extension portions 34A) and the airbag body 40 (twisting of the neck N of the passenger D due to entering into the gap) during the latter half of restraining the passenger D (spanning from the intermediate-stage to the later-stage) as illustrated in FIG. 13C. This thereby enables the passenger D to be appropriately restrained.

Due to providing the guide cloths 62, an amount of head movement of the passenger D can be reduced in the front-rear direction and the left-right direction. This thereby enables ingression of the head H as far as the band shaped front-lower tethers (omitted in the drawings) to be physically suppressed or prevented by the guide cloths 62 even in cases in which, for example, the front-lower tethers 58 are band shaped tethers having a specific width. Namely, the neck N of the passenger D can be suppressed or prevented by the guide cloths 62 from hitting (snagging on) such band shaped front-lower tethers.

Fifth Exemplary Embodiment

Next, description follows regarding a fifth exemplary embodiment. Note that the same reference numerals will be appended to locations equivalent to those of the first exemplary embodiment to the fourth exemplary embodiment and detailed explanation thereof will be omitted (including of common operation and effects).

As illustrated in FIG. 14, the fifth exemplary embodiment differs from the first exemplary embodiment in that a recess 64 indented toward the front side in plan view is formed at a left-right direction central portion of a rear wall (wall face on the rear side) of the airbag body 40, with the recess 64 spanning across the entire height direction of the rear wall.

The recess 64 is configured so as to be formed by at least two band shaped tethers 66 provided extending along the front-rear direction inside the airbag body 40 at a separation from each other in the height direction and having a specific length (a length shorter than the inflated and deployed length toward the rear side of the airbag body 40 in plan view).

Figure 15A:
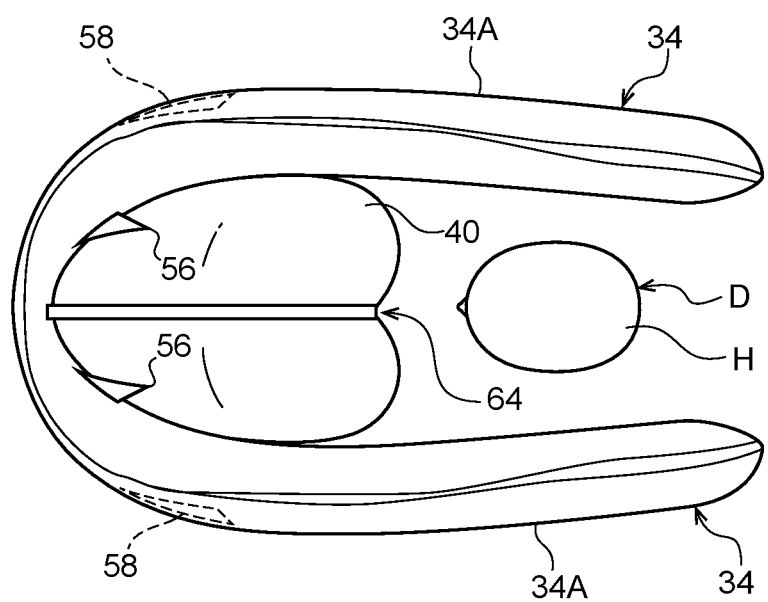
FIG. 15A is an explanatory diagram illustrating a plan view of a process up to a passenger being restrained by an airbag of an airbag device according to the fifth exemplary embodiment.
Figure 15B:
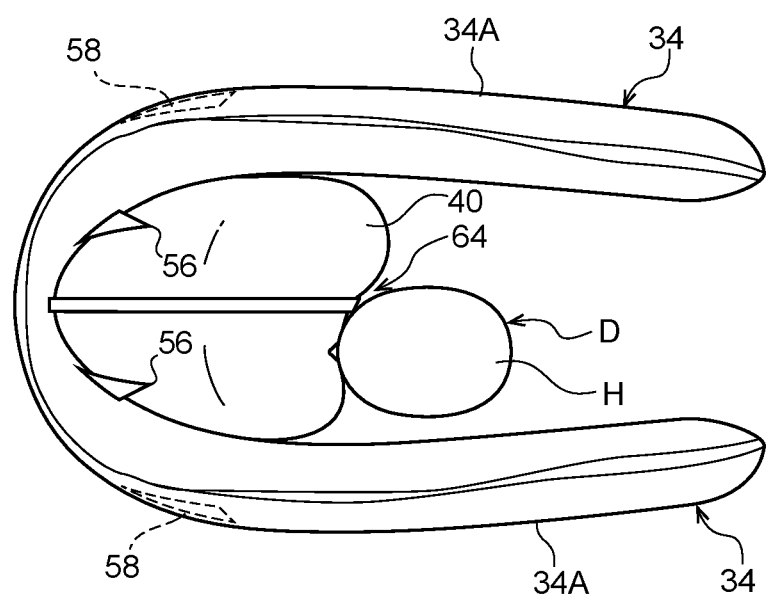
FIG. 15B is an explanatory diagram illustrating a plan view of a process up to a passenger being restrained by an airbag of an airbag device according to the fifth exemplary embodiment.
Figure 15C:
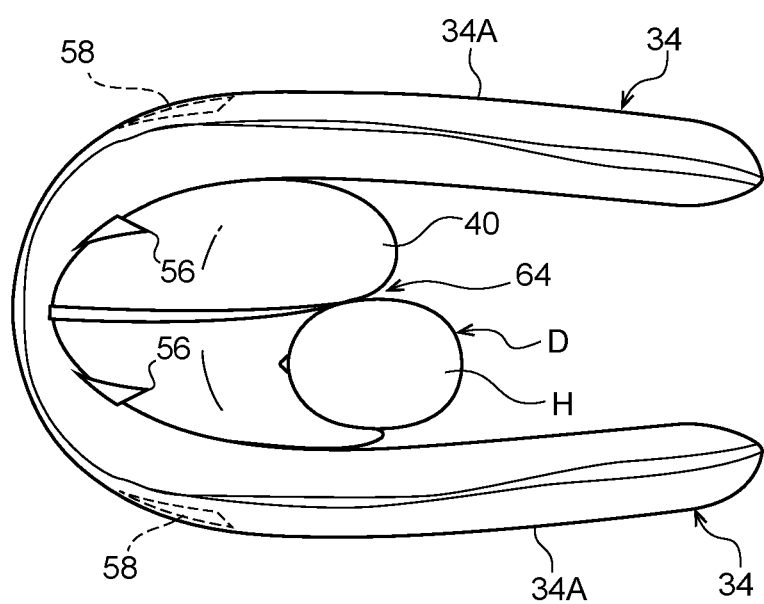
FIG. 15C is an explanatory diagram illustrating a plan view of a process up to a passenger being restrained by an airbag of an airbag device according to the fifth exemplary embodiment.

This means that even in cases in which the vehicle has had an offset collision or an oblique collision and at least the head H of the passenger D has moved obliquely toward the front side as illustrated in FIG. 15A and FIG. 15B, the airbag 32 configured in this manner ensures that at least the head H of the passenger D is held by the airbag body 40 without coming out of the recess 64 of airbag body 40 during the latter half of restraining the passenger D (spanning from the intermediate-stage to the later-stage) as illustrated in FIG. 15C.

Namely, the recess 64 of the airbag body 40 enables suppression or prevention of at least the head H of the passenger D from entering gaps between the front portions of the front-rear chamber 34 (front-rear extension portions 34A) and the airbag body 40 (twisting of the neck N of the passenger D due to entering into the gaps) during the latter half of restraining the passenger D (spanning from the intermediate-stage to the later-stage). This thereby enables the passenger D to be appropriately restrained.

Due to forming the recess 64 to the airbag body 40, the amount of head movement of the passenger D can be reduced in the front-rear direction and the left-right direction. This thereby enables ingression of the head H as far as the band shaped front-lower tethers (omitted in the drawings) to be physically suppressed or prevented even in cases in which, for example, the front-lower tethers 58 are band shaped tethers having a specific width. Namely, the neck N of the passenger D can be suppressed or prevented from hitting (snagging on) such band shaped front-lower tethers.

Although the airbag device 30 and the passenger protection device 10 according to the present exemplary embodiment have been described with reference to the drawings, the airbag device 30 and the passenger protection device 10 according to the present exemplary embodiment are not limited to those illustrated in the drawings, and appropriate design changes may be made within a range not departing from the spirit of the present disclosure.

For example, instead of each of the one-end portions of the pair of rear tethers 54 being attached to the airbag body 40 at the respective wall faces on the left and right sides at a front side of a lower portion of the airbag body 40 inflated and deployed further downward than the front-rear chamber 34, each of the one-end portions may be attached by being sewn to a length direction central portion of the pair of front-rear extension portions 34A, and more specifically to each front portion of the inflated and deployed front-rear extension portions 34A.

The first exemplary embodiment may be configured such that at least the front-lower tethers 58 are planar tethers from out of the front-upper tethers 56 and the front-lower tethers 58. The second exemplary embodiment may be configured such that at least the front-lower tethers 58 are bag shaped tethers (lower inflation portions) from out of the front-upper tethers 56 and the front-lower tethers 58.

What is claimed is:
1. An airbag device, comprising:
an inflator that generates gas during a vehicle collision; and an airbag that is supplied with the gas generated by the inflator, and that inflates and deploys from a seat rear side of a vehicle seat toward a seat front side via a seat upper side, wherein, in an inflated and deployed state, the airbag includes:
- a pair of front-rear chambers extending in a seat front-rear direction via left and right sides of a head of a passenger seated in the vehicle seat, and
- an airbag body that is in communication with the pair of front-rear chambers, that is disposed at a seat front side of the passenger between the pair of front-rear chambers, and that is compression deformed in a state supported by the pair of front-rear chambers during restraint of the passenger, and wherein the airbag is configured such that, in an inflated and deployed state, entry of at least the head of the passenger into a gap between the front-rear chamber and the airbag body is suppressed during a latter half of restraining the passenger, wherein the airbag includes:
- a left-right pair of upper tethers that couple the pair of front-rear chambers to upper portions of the airbag body, and
- a left-right pair of lower tethers that couple the pair of front-rear chambers to lower portions of the airbag body, and wherein at least the lower tethers are planar tethers having a substantially triangular shape configured with left-right symmetrical shapes to cover the gap.

2. The airbag device of claim 1, wherein the airbag includes a left-right pair of lower inflating portions that fill gaps between the pair of front-rear chambers and lower portions of the airbag body.

3. The airbag device of claim 2, wherein the lower inflating portions are configured so as to be supplied with the gas from the pair of front-rear chambers through lower communication holes, with an opening surface area of the lower communication holes being smaller than an opening surface area of a communication hole for supplying the gas from the pair of front-rear chambers to the airbag body.

4. The airbag device of claim 2, wherein the airbag includes a left-right pair of upper inflating portions that fill gaps between the pair of front-rear chambers and upper portions of the airbag body.

5. The airbag device of claim 4, wherein the upper inflating portions are configured so as to be supplied with the gas from the pair of front-rear chambers through upper communication holes, with an opening surface area of the upper communication holes being smaller than an opening surface area of a communication hole for supplying the gas from the pair of front-rear chambers to the airbag body.

6. The airbag device of claim 1, wherein bulge portions having convex shapes to fill gaps relative to the airbag body are formed at the pair of front-rear chambers on inside faces opposing each other in a seat width direction.

7. The airbag device of claim 1, wherein the airbag includes a pair of guide cloths to cover the gap and having respective one-end portions sewn to the pair of front-rear chambers at inside faces opposing each other in a seat width direction, and respective other-end portions sewn to the airbag body.

8. The airbag device of claim 1, wherein a recess in plan view is formed at a seat width direction central portion of a wall face on a seat rear side of the airbag body.

9. A passenger protection device, comprising:
a vehicle seat for a passenger to sit on; and
the airbag device of claim 1 installed at a location at the seat rear side of the vehicle seat.

10. An airbag device, comprising:
an inflator that generates gas during a vehicle collision; and
an airbag that is supplied with the gas generated by the inflator, and that inflates and deploys from a seat rear side of a vehicle seat toward a seat front side via a seat upper side, wherein, in an inflated and deployed state, the airbag includes:
- a pair of front-rear chambers extending in a seat front-rear direction via left and right sides of the a head of a passenger seated in the vehicle seat, and
- an airbag body that is in communication with the pair of front-rear chambers, that is disposed at a seat front side of the passenger between the pair of front-rear chambers, and that is compression deformed in a state supported by the pair of front-rear chambers during restraint of the passenger, and wherein the airbag is configured such that, in an inflated and deployed state, entry of at least the head of the passenger into a gap between the front-rear chamber and the airbag body is suppressed during a latter half of restraining the passenger, and wherein the airbag includes a left-right pair of lower inflating portions that fill gaps between the pair of front-rear chambers and lower portions of the airbag body.

11. The airbag device of claim 10, wherein the lower inflating portions are configured so as to be supplied with the gas from the pair of front-rear chambers through lower communication holes, with an opening surface area of the lower communication holes being smaller than an opening surface area of a communication hole for supplying the gas from the pair of front-rear chambers to the airbag body.

12. The airbag device of claim 10, wherein the airbag includes a left-right pair of upper inflating portions that fill gaps between the pair of front-rear chambers and upper portions of the airbag body.

13. The airbag device of claim 12, wherein the upper inflating portions are configured so as to be supplied with the gas from the pair of front-rear chambers through upper communication holes, with an opening surface area of the upper communication holes being smaller than an opening surface area of a communication hole for supplying the gas from the pair of front-rear chambers to the airbag body.

14. An airbag device, comprising:
an inflator that generates gas during a vehicle collision; and
an airbag that is supplied with the gas generated by the inflator, and that inflates and deploys from a seat rear side of a vehicle seat toward a seat front side via a seat upper side, wherein, in an inflated and deployed state, the airbag includes:
- a pair of front-rear chambers extending in a seat front-rear direction via left and right sides of the a head of a passenger seated in the vehicle seat, and
- an airbag body that is in communication with the pair of front-rear chambers, that is disposed at a seat front side of the passenger between the pair of front-rear chambers, and that is compression deformed in a state supported by the pair of front-rear chambers during restraint of the passenger, and wherein the airbag is configured such that, in an inflated and deployed state, entry of at least the head of the passenger into a gap between the front-rear chamber and the airbag body is suppressed during a latter half of restraining the passenger, and wherein bulge portions having convex shapes to fill gaps relative to the airbag body are formed at the pair of front-rear chambers on inside faces opposing each other in a seat width direction.

15. An airbag device, comprising:
an inflator that generates gas during a vehicle collision; and
an airbag that is supplied with the gas generated by the inflator, and that inflates and deploys from a seat rear side of a vehicle seat toward a seat front side via a seat upper side,
wherein, in an inflated and deployed state, the airbag includes:
   a pair of front-rear chambers extending in a seat front-rear direction via left and right sides of a head of a passenger seated in the vehicle seat,
   an airbag body that is in communication with the pair of front-rear chambers, that is disposed at a seat front side of the passenger between the pair of front-rear chambers, and that is compression deformed in a state supported by the pair of front-rear chambers during restraint of the passenger, and
   a coupling portion that connects front end portions of the pair of front-rear chambers together in a left-right direction, and
wherein the airbag is configured such that, in an inflated and deployed state, entry of at least the head of the passenger into a gap between the front-rear chamber and the airbag body is suppressed during a latter half of restraining the passenger, and wherein the airbag body inflates and deploys at a rear side of the coupling portion toward the seat front side delayed with respect to the pair of front-rear chambers such that the airbag body is disposed between the pair of front-rear chambers at a front side of the passenger.

16. The airbag device of claim 15, wherein:
the airbag includes a left-right pair of upper tethers that couple the pair of front-rear chambers to upper portions of the airbag body, and a left-right pair of lower tethers that couple the pair of front-rear chambers to lower portions of the airbag body, and
a fabric forming the left-right pair of upper tethers and the left-right pair of lower tethers is less extensible than base cloths forming the pair of front-rear chambers and a base cloth forming the airbag body.

17. The airbag device of claim 15, wherein:
the airbag includes a left-right pair of upper tethers that couple the pair of front-rear chambers to upper portions of the airbag body, and a left-right pair of lower tethers that couple the pair of front-rear chambers to lower portions of the airbag body,
the left-right pair of upper tethers are configured so as to couple wall faces at left and right sides of a front side of an upper portion of the airbag body inflated and deployed further upward than the pair of front-rear chambers, to respective front portions of the pair of front-rear chambers, and
the left-right pair of lower tethers are configured so as to couple left and right end portions of the coupling portion to the respective front portions of the pair of front-rear chambers.

* * * * *